(12) United States Patent
Easter

(10) Patent No.: US 8,371,520 B2
(45) Date of Patent: Feb. 12, 2013

(54) RAPIDLY CONVERTIBLE HYBRID AIRCRAFT AND MANUFACTURING METHOD

(76) Inventor: William Craig Easter, Weatherford, OK (US)

(*) Notice: Subject to any disclaimer, the term of this patent is extended or adjusted under 35 U.S.C. 154(b) by 237 days.

(21) Appl. No.: 12/846,882

(22) Filed: Jul. 30, 2010

(65) Prior Publication Data

US 2011/0036939 A1     Feb. 17, 2011

Related U.S. Application Data

(60) Provisional application No. 61/230,307, filed on Jul. 31, 2009.

(51) Int. Cl.
B64C 37/00     (2006.01)
B64C 27/24     (2006.01)
B64C 3/56      (2006.01)
B64C 9/34      (2006.01)

(52) U.S. Cl. ............ 244/2; 244/7 A; 244/199.4; 244/46; 244/49; 244/87

(58) Field of Classification Search .............. 244/2, 7 A, 244/7 R, 6, 45 R, 46, 49, 39, 198, 199.1, 244/199.4, 87, 91

See application file for complete search history.

(56) References Cited

U.S. PATENT DOCUMENTS

| | | | |
|---|---|---|---|
| 1,504,663 A * | 8/1924 | Wright et al. | 244/217 |
| 2,137,382 A * | 11/1938 | Blaylock et al. | 244/217 |
| 2,152,835 A * | 4/1939 | Bolas | 244/217 |
| 2,169,416 A * | 8/1939 | Griswold | 244/216 |
| 2,241,335 A * | 5/1941 | Wedberg | 244/217 |
| 2,458,900 A * | 1/1949 | Erny | 91/167 R |
| 2,494,547 A * | 1/1950 | Fish, Jr. | 244/2 |
| 2,539,489 A * | 1/1951 | Smith | 244/2 |
| 2,553,952 A * | 5/1951 | Turner, Jr. | 244/2 |
| 2,558,501 A * | 6/1951 | Turner, Jr. | 244/67 |
| 2,562,491 A * | 7/1951 | Hall | 244/2 |
| 2,573,271 A | 10/1951 | Perel | |
| 2,612,329 A * | 9/1952 | Crandall et al. | 244/217 |
| 2,619,184 A * | 11/1952 | Hall | 180/54.1 |
| 2,692,095 A * | 10/1954 | Carpenter | 244/50 |
| 2,699,299 A * | 1/1955 | Herrick | 244/7 A |
| 2,713,465 A * | 7/1955 | Novinger | 244/2 |
| 2,788,182 A * | 4/1957 | Tobin et al. | 244/48 |
| 2,940,688 A | 6/1960 | Bland | |
| 3,065,927 A | 11/1962 | Mills | |
| 3,138,351 A | 6/1964 | Zuck | |
| 3,163,376 A * | 12/1964 | Macaulay | 244/7 R |
| 3,371,886 A | 3/1968 | Schertz | |
| 3,596,852 A * | 8/1971 | Wakefield | 244/13 |
| 3,612,440 A | 10/1971 | Strong | |
| 3,614,024 A | 10/1971 | Millman | |
| 3,721,406 A * | 3/1973 | Hurlbert | 244/216 |
| 3,954,231 A * | 5/1976 | Fraser | 244/225 |
| 4,132,374 A * | 1/1979 | Abell | 244/46 |

(Continued)

*Primary Examiner* — Peter M. Poon
*Assistant Examiner* — Timothy Schwarz

(57) ABSTRACT

A hybrid fixed wing aircraft converts into a roadworthy vehicle in a matter of seconds therefore operating efficiently in both air and ground transportation systems. The single piece wing is mounted on a skewed pivot that is on the lower portion of the fuselage and is operated by a pushbutton operating system. The aircraft includes telescopic twin boom tail design that when extended allows good pitch stability and damping. The aircraft's wing area may be increased with additional telescopic wing tip segments. This allows an increase in aspect ratio, hence improving efficiency at high loads. This feature also creates a reduction in induced drag at cruise speed by simply retracting the tips in flight. The vehicle has a unique synchronized control system that switches from flight to ground mode without input from the operator, thereby providing a natural interface for the operator.

20 Claims, 23 Drawing Sheets

U.S. PATENT DOCUMENTS

| | | | |
|---|---|---|---|
| 4,165,846 A | 8/1979 | Groeger | |
| 4,269,374 A | 5/1981 | Miller | |
| 4,358,072 A | 11/1982 | Williamson | |
| 4,627,585 A | 12/1986 | Einstein | |
| 4,717,097 A * | 1/1988 | Sepstrup | 244/217 |
| 4,842,218 A * | 6/1989 | Groutage et al. | 244/3.28 |
| 4,986,493 A * | 1/1991 | Sarh | 244/2 |
| 4,998,689 A * | 3/1991 | Woodcock | 244/46 |
| 5,633,544 A | 5/1997 | Toida et al. | |
| 5,655,737 A * | 8/1997 | Williams et al. | 244/212 |
| 5,671,898 A * | 9/1997 | Brown | 244/46 |
| 5,788,614 A * | 8/1998 | Simonson | 482/97 |
| 5,836,541 A * | 11/1998 | Pham | 244/2 |
| 5,984,228 A * | 11/1999 | Pham | 244/2 |
| 6,079,672 A * | 6/2000 | Lam et al. | 244/217 |
| 6,082,665 A * | 7/2000 | Spitzer | 244/2 |
| 6,086,014 A * | 7/2000 | Bragg, Jr. | 244/2 |
| 6,098,927 A * | 8/2000 | Gevers | 244/123.8 |
| 6,129,306 A | 10/2000 | Pham | |
| 6,224,012 B1 | 5/2001 | Wooley | |
| 6,227,487 B1 * | 5/2001 | Clark | 244/99.12 |
| 6,260,799 B1 * | 7/2001 | Russ | 244/49 |
| 6,264,136 B1 * | 7/2001 | Weston | 244/48 |
| 6,491,261 B1 * | 12/2002 | Blake | 244/213 |
| 6,554,229 B1 * | 4/2003 | Lam et al. | 244/217 |
| 6,619,584 B1 * | 9/2003 | Haynes | 244/2 |
| 6,669,137 B1 * | 12/2003 | Chen | 244/7 R |
| 6,834,835 B1 * | 12/2004 | Knowles et al. | 244/198 |
| 7,445,178 B2 | 11/2008 | McCoskey et al. | |
| 7,762,500 B1 * | 7/2010 | Dhall | 244/218 |
| 7,789,343 B2 * | 9/2010 | Sarh et al. | 244/46 |
| 7,866,610 B2 * | 1/2011 | Bousfield | 244/218 |
| 7,874,512 B2 * | 1/2011 | Xu | 244/2 |
| 2005/0211827 A1 * | 9/2005 | Barocela | 244/46 |
| 2005/0224642 A1 | 10/2005 | Sullivan | |
| 2006/0065779 A1 | 3/2006 | McCoskey | |
| 2008/0011897 A1 * | 1/2008 | Xu | 244/2 |
| 2008/0258014 A1 * | 10/2008 | McCoskey et al. | 244/221 |
| 2009/0166477 A1 * | 7/2009 | Bousfield | 244/218 |
| 2010/0230532 A1 * | 9/2010 | Dietrich et al. | 244/49 |
| 2011/0042525 A1 * | 2/2011 | Parker | 244/213 |

* cited by examiner

RAPIDLY CONVERTIBLE HYBRID AIRCRAFT AND MANUFACTURING METHOD

CROSS-REFERENCE TO RELATED APPLICATIONS

The present application claims priority from Provisional U.S. Patent Application Ser. No. 61/230,307 filed on Jul. 31, 2009 and incorporated herein by reference.

FIELD OF THE INVENTION

The present invention relates to a roadable aircraft, or aircraft that can change shape on the ground or in the air. In particular, the present invention is directed toward an aircraft that can quickly convert to an automobile or motorcycle.

BACKGROUND OF THE INVENTION

Roadable aircraft present many design challenges. For example, the craft must be small enough in its retracted or folded position to fit within (standard) garages, drive-up facilities and parking facilities, which limits the principle dimensions to a volume of 20 feet by 7 feet by 7 feet. In order to fit within the current transportation system to avoid heavy glass and all wheel braking, the craft should be below 1500-pound empty weight (curb weight) and licensed as a 3-wheeled motorcycle.

The folding and storing of the wings presents particular difficulty. If the wings are folded aft, the aircraft may fall on its tail. If the wings are folded forward to a preferred center of gravity (CG) location, then the wing may block the visibility of the operator. If the wing is stored on top of the vehicle, gusts from passing trucks may blow the vehicle over on the ground. Detachable wings have been tried in past, for example, the Molt Taylor Aerocar. However re-attaching the wings in less than perfect weather conditions provides difficulty even for trained personnel. Some Prior Art Roadable aircraft, such as the Aerocar, towed the wing and tail along in trailer fashion, which created additional problems, such as clearance and susceptibility to cross-winds on the road. Damage to the control surfaces on the ground must be minimized so the wing needs to be stored where it can be protected. Complex folding mechanisms are prone to failure, require maintenance, and are heavy. Wings and flying surfaces dangling off the aircraft provide poor aesthetics for the vehicle.

In order to move the aircraft on the ground several schemes have been employed. A common method is to provide a clutch to the main engine and power is sent through a heavy transmission. Some designs use hydraulic motors in the main gear driven by a hydraulic pump off the main engine. Others use a totally separate engine for roadable power. There are many ways others have dealt with the problem of operational controls of roadable aircraft and flying cars. The principle problem is that there is a mix between the roll and yaw axis in the separate vehicles.

Another problem is in the layout of road and flying controls. One designer placed the flight controls in the left side of the cockpit and the ground controls on the right. Another designer placed the controls up under the panel where the operator pulls them out when usage is desired. Another designer has the control wheel designed such that the wheel is in half and then it is rotated upward to form a complete circle for road use. Another designer suggests using a steering wheel oriented such that it resembles ones used in buses to overcome this obstacle. Other have the controls located outside or mixed between existing controls, causing possible confusion in emergency situations. Each of these Prior Art designs has their advantages and disadvantages. A simple lightweight solution is needed to meet each of these needs. Yet provides enough difference from one vehicle to the other so that the operator identifies which vehicle he is operating even in emergency situation More than 70 auto-planes have been designed and patented over recent decades but all seem to have complex structures which are incapable of quick and convenient conversion from plane to road vehicle and vice versa. Williamson, U.S. Pat. No. 4,358,072, incorporated herein by reference, describes a land vehicle and aircraft combination, which has separate engines for the land vehicle and the aircraft. This particular Prior Art invention involves a land vehicle, which physically separates from an aircraft fuselage. While this allows a pilot to "fly" his auto, it requires complicated folding stock for aircraft controls, fuselage tilting or jacking, airport storage area for the fuselage which must be left behind and return to the point of landing for further flying.

Miller, U.S. Pat. No. 4,269,374, incorporated herein by reference, is directed to an auto-plane which has wing and tail structures that are movable outwardly for flying and inwardly for storage and road vehicle use. All of the parts remain intact in both the road and the flying forms. However, the Miller device has complicated fold away wheels and has wings that fold away in a complicated and complex fashion, namely, the front wings must be rotated about a fixed line 90 degrees from horizontal surface to vertical surface, and also be swung into the side of the vehicle 90 degrees, and must be folded in half along their lengths, requiring rotatability, lengthwise foldability and upward swivelability. The Miller design also has a tailpiece and tail wing that must not only slide forward but also downward. This Prior Art auto-plane is very complex and, while it embodies the basics of wing hingeability, locking pins and folding mechanisms, it illustrates vividly what an auto-plane should not be if it is to be convenient, practical, cost effective, and safe.

Groeger, U.S. Pat. No. 4,165,846, incorporated herein by reference, teaches a land-air-water vehicle having doors which open to become wings, and a large diameter set of tires which acts to assist in both land and water propulsion. Unwindable fins are used for control. Millman, U.S. Pat. No. 3,614,024, incorporated herein by reference, describes a combined watercraft and aircraft having folding wings so that the aircraft can rest on a remotely controlled watercraft. The watercraft is controlled by the pilot as a tow means until flying velocity and altitude are achieved, at which time the tow rope is "unreeled" and the aircraft is flown as a glider.

Strong, U.S. Pat. No. 3,612,440, incorporated herein by reference, illustrates a warp action spoiler plate aileron in a combined airplane and automobile. This Prior Art auto-plane has wings which swing 90 degrees back into the body of the vehicle. Unfortunately, the folded wings must overlap one another in their storage slot and so must move up or down as they are swung in so as to render one partially over the other. Schertz, U.S. Pat. No. 3,371,886, incorporated herein by reference, teaches an auto-plane wherein each wing is twice hinged and the outer portion folds 180 degrees over and flat with an inner portion, and then both the inner and outer portions as a single entity are folded upwardly 90 degrees against one of two vertical stabilizers (twin tails). Unfortunately, these twice folded stored vertical wing portions render the auto-plane very top heavy. Further, they create the need for significantly more hardware, hinges, locking mechanisms, and create a four-wing thick top clearance problem.

Zuck, U.S. Pat. No. 3,138,351, incorporated herein by reference, describes an auto-plane wherein the wings swing back up so as to partially rest upon one another. Not only are complex wing movements required, but also the wing support struts are cut and hinged so as to break and swing inwardly in an awkward and broken path. Zuck requires substantial, complex fold up hardware typical of the prior art. Mills, U.S. Pat. No. 3,065,927, incorporated herein by reference, illustrates an auto-plane with a top propeller (single prop gyrocopter) and wings which fold in. Each wing has two break points and two sets of hinges, again requiring more hardware and weight.

Bland, U.S. Pat. No. 2,940,688, incorporated herein by reference, discloses an aircraft adaptable for road vehicle use and for sailing as a sailboat. The wings rotate 90 degrees up and are secured to the roof when the invention is used as a sailboat. When used as a road vehicle the wings rotate 90 degrees up and then twist 90 degrees to overlap one another and then drop back 90 degrees to lay atop the vehicle. The tail has dual rudders and elevators, one of each on a telescoping tubular member. Unfortunately, storage of the wings for road use requires a complex. series of three different motions and the necessary hardware, hinges and latches to achieve these. Bland teaches a retractable tail but the method of operation is external to the telescopic tubes and individually operated.

Perel, U.S. Pat. No. 2,573,271, incorporated herein by reference, discloses a method to pivot two wings into a fuselage for storage. This method leaves the delicate control surfaces in a position which is likely to be damaged. Pham, U.S. Pat. No. 6,129,306, incorporated herein by reference, discloses a wing that is rotatably mounted on top of a fuselage on a wing pivot mechanism whereby the wing is horizontally rotatable between a flight position with the wing span approximately orthogonal to the fuselage's longitudinal axis and a roadable position with the wing span approximately parallel to the longitudinal axis of the fuselage, thereby allowing the vehicle to have a maximum width within legal limit for use in the roadway.

Wooley, U.S. Pat. No. 6,224,012, incorporated herein by reference, discloses a wing positioned above a fuselage of a vehicle with means to rotate the wing a nominal ninety degrees about a vertical axis from a flight position to a ground travel position where the wing span is aligned with the fuselage. Einstein, U.S. Pat. No. 4,627,585, incorporated herein by reference, discloses a Telescopic tail section but fails to teach a method of deployment and method to synchronize its movements in order to prevent binding. In the absence of a synchronizing method one side even slightly out of alignment due to wear or manufacturing tolerances will bind and not function properly.

McCoskey, Published U.S. Patent Application No. US2006/0065779, incorporated herein by reference, discloses using electrical power to move an aircraft on the ground using only the nose wheel. The motor is not integrated into the wheel and contains planetary gears systems and a cone clutching devise. Further the stator and rotor are not optimized for maximum torque. Because the motor is not integrated into the wheel it provides a drag configuration especially for fixed wing aircraft.

SUMMARY OF THE INVENTION

The roadable aircraft of the present invention solves the problems of the Prior Art in that it is easy to convert from aircraft to a roadable vehicle, by the push of a button. The single wing is stored longitudinally in the fuselage and is only slightly wider than the cord of the wing. The wings pivot into the fuselage in a novel way using a novel pivoting mechanism, which provides a compact aircraft for storage and roadwork. A single-piece wing is rotatably mounted on the lower portion in the fuselage, which provides a lower center of gravity. The wing is mounted on a pivot may be skewed in any direction to control the final retracted position of the wing. The center of gravity is changed by the pivotal movement of the wing to a preferred location for roadwork and is in the proper location for flight in the extended position.

As the wing is rotated, a preferred change in CG is also accomplished. Fuel can transfer from the high wing (rear) to a lower wing for the purpose of moving the CG to a preferred location for roadwork. The volume of tail area is sufficient to provide easy flight even from unskilled pilots. The aircraft may have 3 or 4 wheels in connection with the ground for landing or takeoff and operates equally as well for ground or air operation. In a preferred embodiment, three wheels are used, so the vehicle can be registered as a motorcycle, and avoid many safety and emissions requirements for four-wheeled vehicles. The aircraft is highly manufacturerable and is simple in construction. The Pilot and passengers may enter the cockpit with out the aid of steps or ladders. Visibility remains the same during road or flight operations.

The primary forward propulsion is from the thrust producer, either propeller or turbine. The wing tips or portion of the wing retracts for the purpose of storage or roadwork and reduced drag in flight. The wing is under the propeller in road operation, which prevents stones from entering the propeller during ground operation and keeps pedestrians out of the propeller plane. The booms of the tail are slightly wider than the wing and protect the wing and control structure during ground operation. The aircraft of the present invention may enter the current transportation system of both road and air. The aircraft may be provided with telescopic twin booms supporting the tail, which may be retracted for road use. The aircraft may also be able to vary the wing area by providing retractable wing tips or ends.

The aircraft has a low CG and is therefore also has a low turnover angle. An electrically driven main gear is used for propulsion on the ground with forward and reverse, control. The control system changes the pilot/operator controls from aircraft to road use automatically, and the movement may be synchronized to the wing movement, so as to convert the controls from air to road (and vice versa) in conjunction with the wing retraction and extension. The aircraft provides a natural interface for the pilot/controller that is most like the controls for that vehicle but provides a tactical feel such that the operator tends to use the appropriate controls in emergency situation. The aircraft that is made from common cross sections and is easy to manufacture. While disclosed in the context of a roadable aircraft, many aspects of the present invention may also be applied to other types of aircraft.

DETAILED DESCRIPTION OF THE INVENTION

Figure 1:
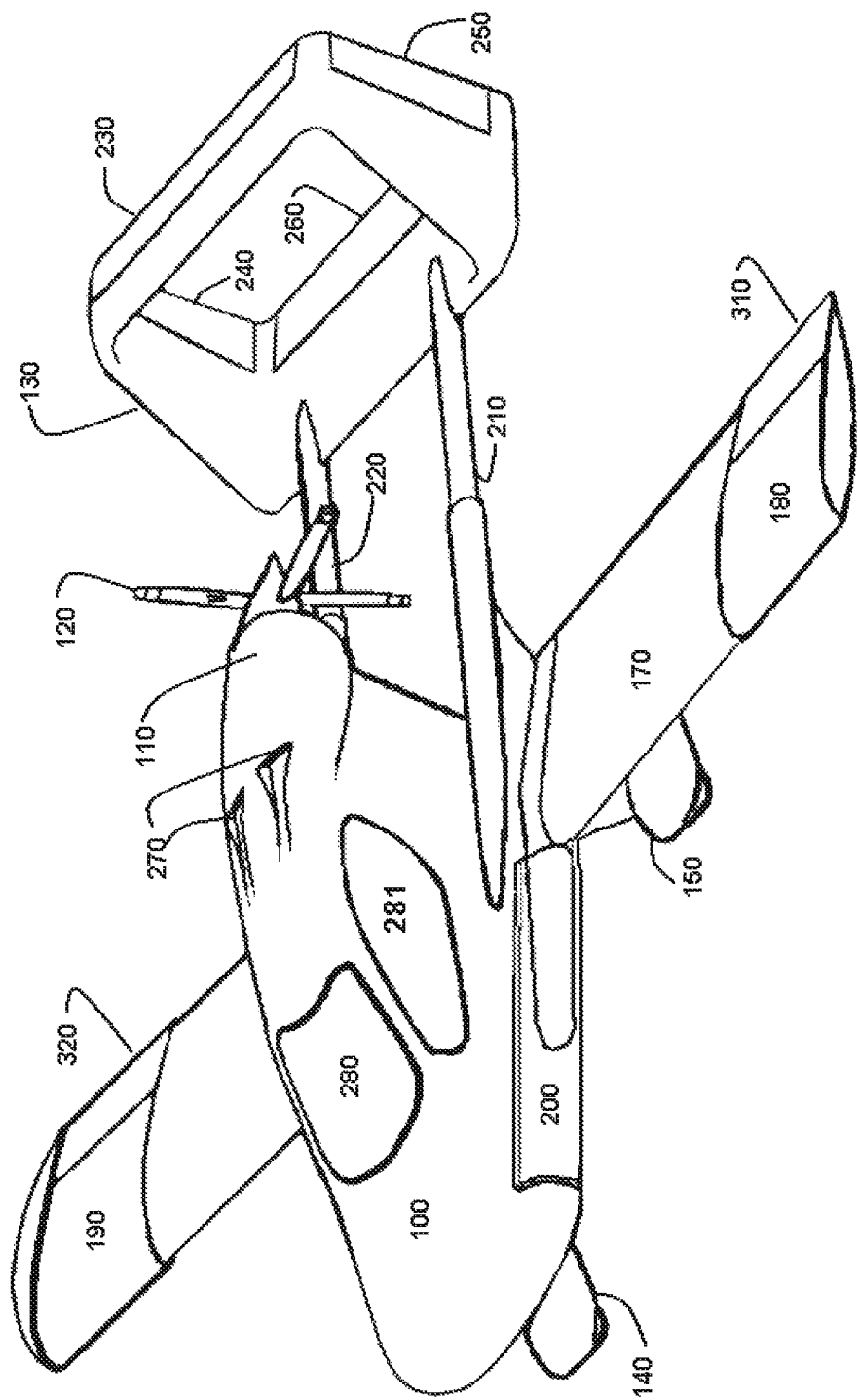
FIG. 1 is a perspective view of the roadable aircraft of the present invention in aircraft mode, illustrating the wings rotated into position for flying with the wing tips extended and tail booms extended.
Figure 2:
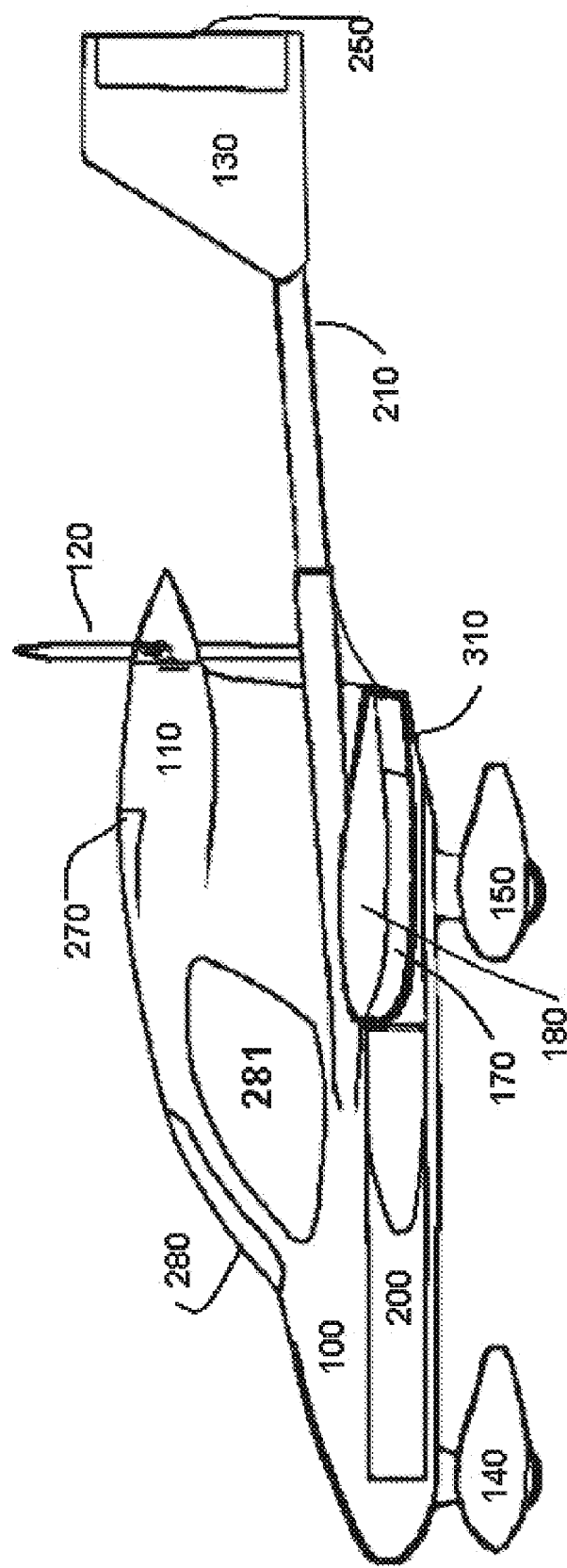
FIG. 2 is a side view of the roadable aircraft of the present invention in aircraft mode, illustrating the wings rotated into position for flying with the wing tips extended and tail booms extended.
Figure 3:
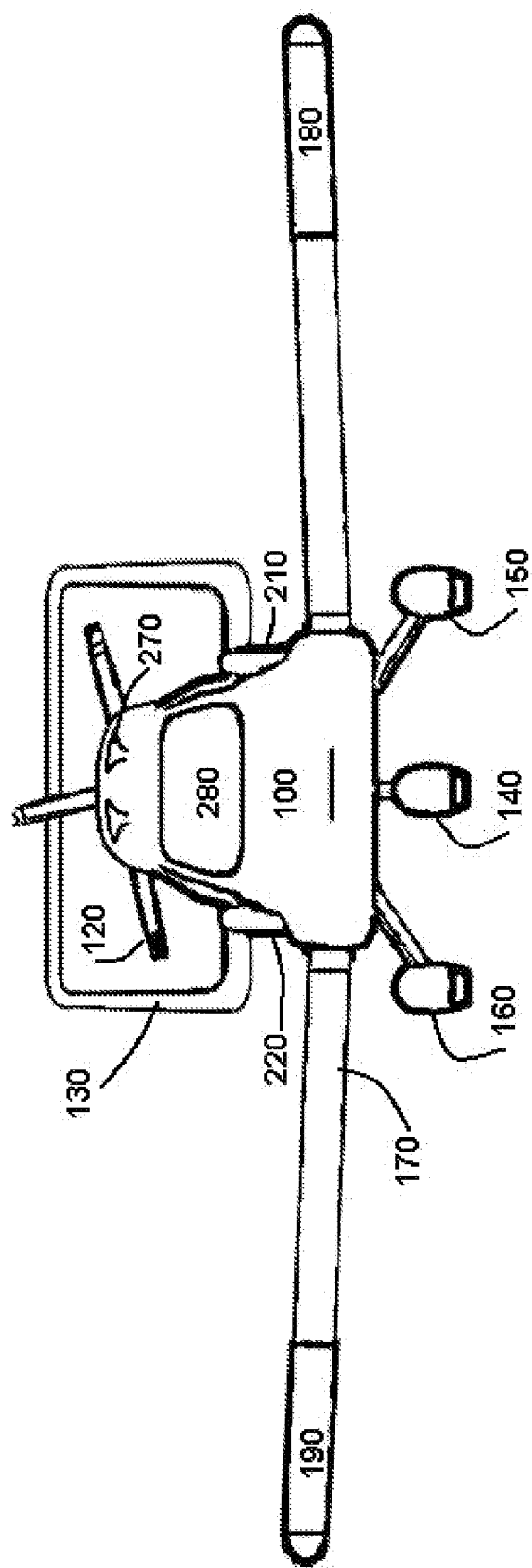
FIG. 3 is a front view of the roadable aircraft of the present invention in aircraft mode, illustrating the wings rotated into position for flying with the wing tips extended and tail booms extended.
Figure 4:
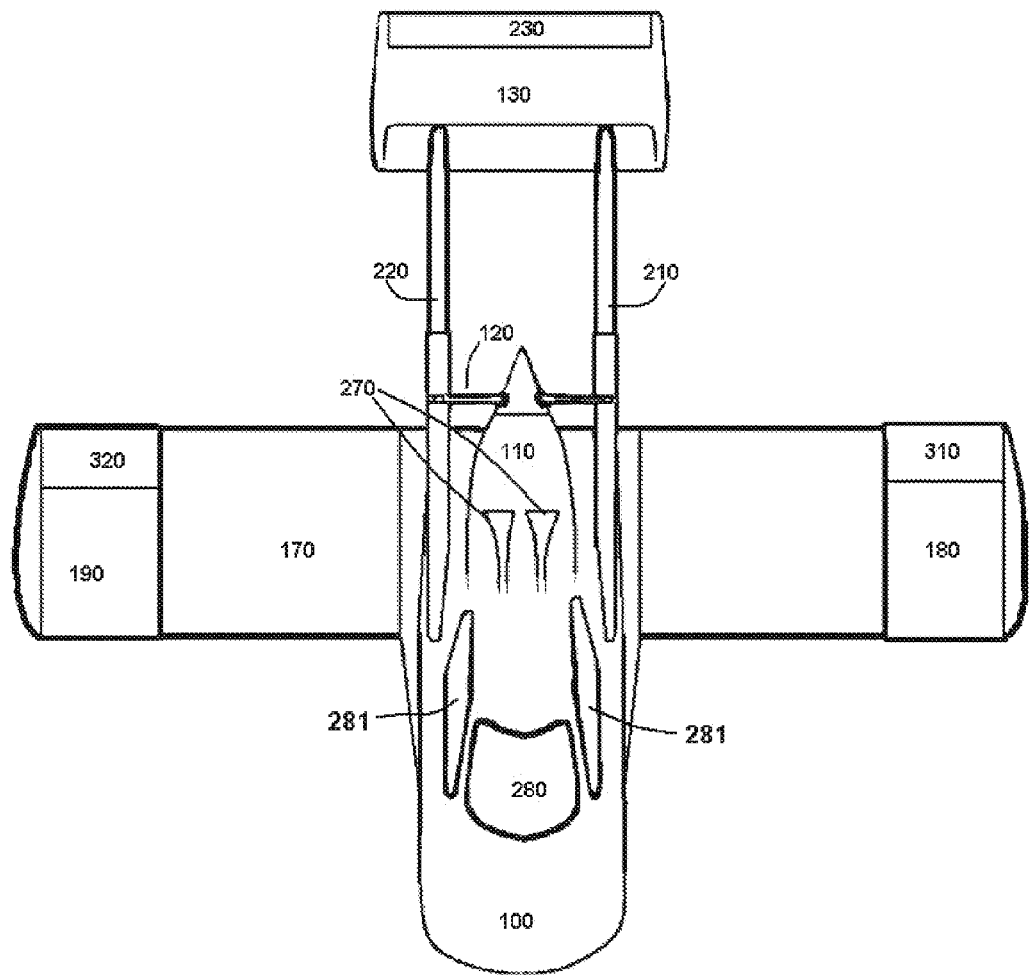
FIG. 4 is a top view of the roadable aircraft of the present invention in aircraft mode, illustrating the wings rotated into position for flying with the wing tips extended and tail booms extended.
Figure 5:
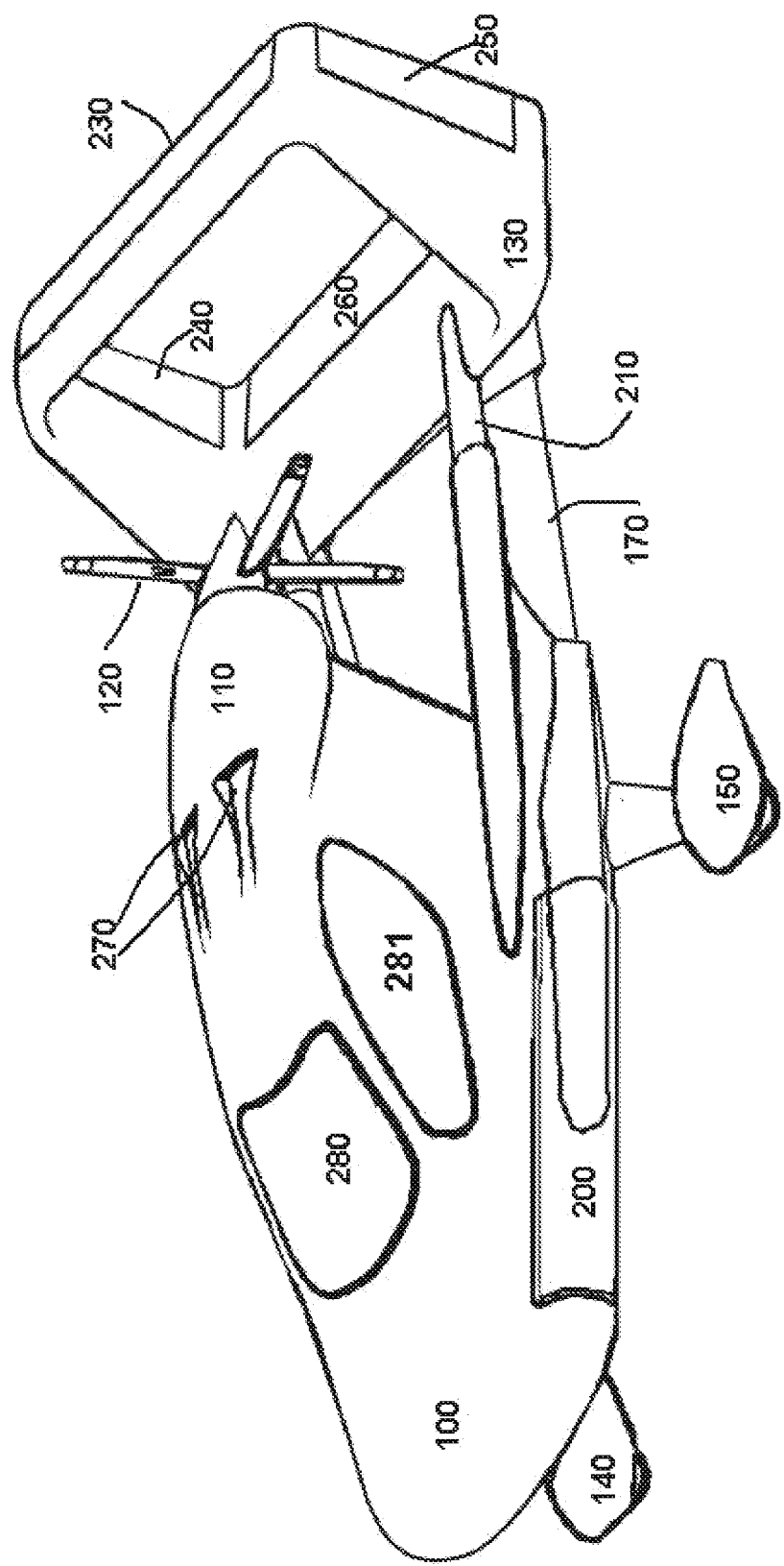
FIG. 5 is a perspective view of the roadable aircraft of the present invention in road mode, illustrating the wings rotated into position for driving with the wing tips retracted and tail booms retracted.
Figure 6:
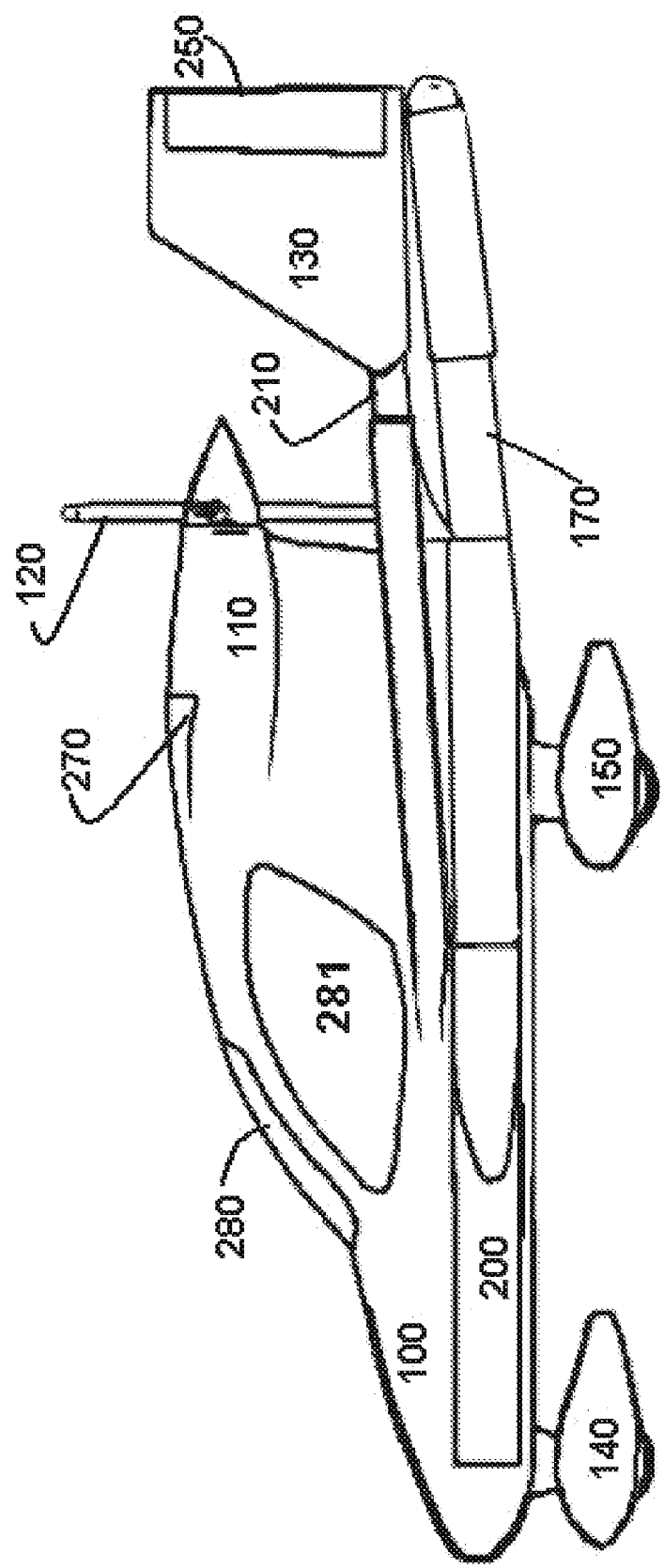
FIG. 6 is a side view of the roadable aircraft of the present invention in road mode, illustrating the wings rotated into position for driving with the wing tips retracted and tail booms retracted.
Figure 7:
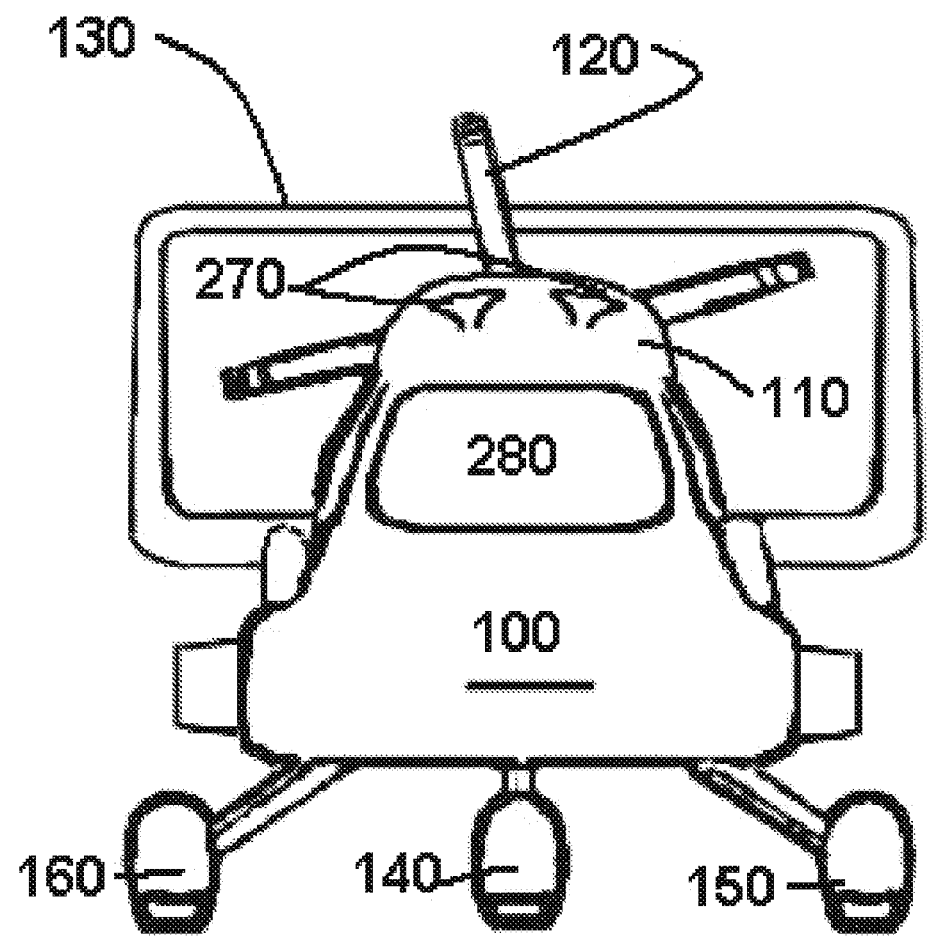
FIG. 7 is a front view of the roadable aircraft of the present invention in road mode, illustrating the wings rotated into position for driving with the wing tips retracted and tail booms retracted.
Figure 8:
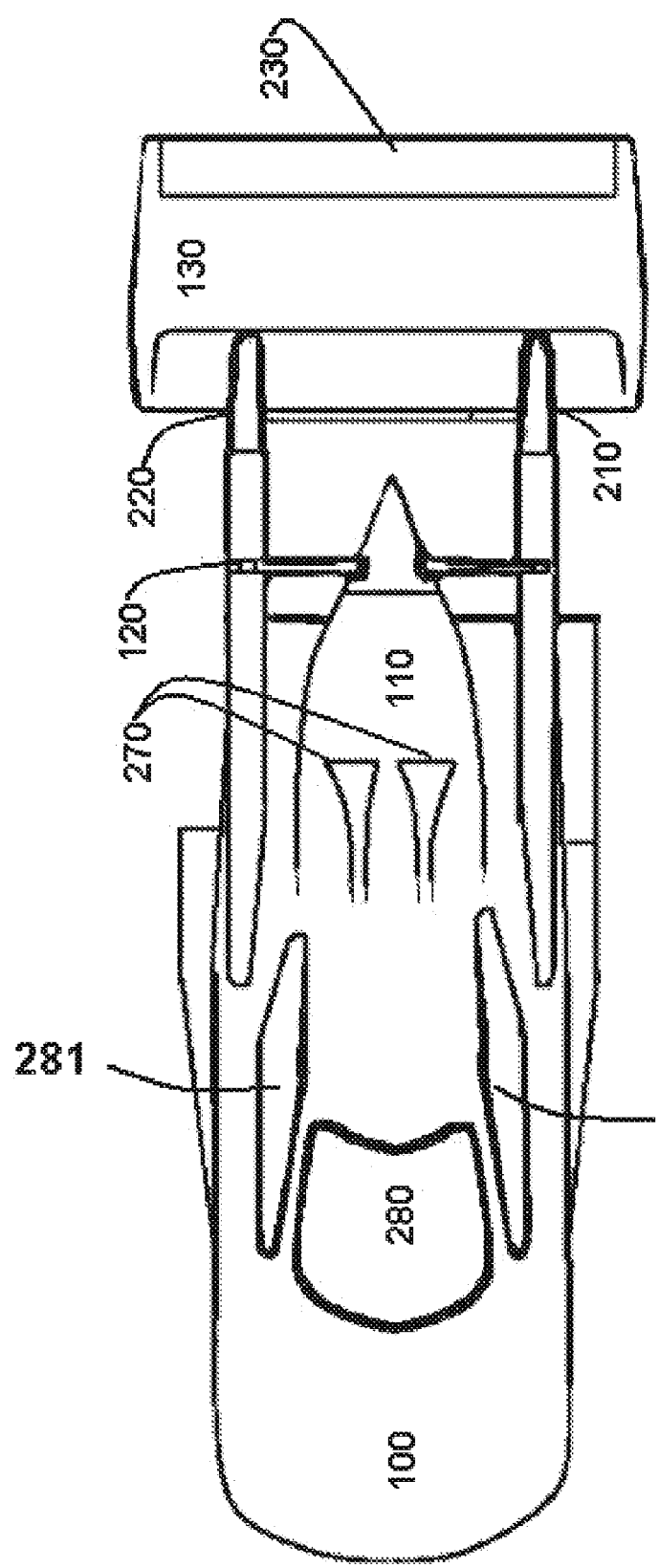
FIG. 8 is a top view of the roadable aircraft of the present invention in road mode, illustrating the wings rotated into position for driving with the wing tips retracted and tail booms retracted.

Referring to FIGS. 1-9, the preferred configuration for roadable aircraft of the present invention is a two-seat aircraft 100 with a pusher propeller 120, twin booms 210 and 220, a box tail 130 and a low wing 170. A preferred configuration is such that the Empty weight is below 1500 pounds so that the vehicle may be licensed in all States as a 3-wheel motorcycle and also possibly as a light sport aircraft if below 1320 pounds. The twin boom configuration 210, 220 keeps the propeller 120 within a well-protected area such that pedestrians cannot easily enter the plane of rotation. The wing 170 in the retract position is located under the propeller 120 to prevents stones and debris from entering the propeller 120 and in combination with the twin booms 210, 220 help to prevent pedestrians from entering the plane of rotation, providing a ground-safe vehicle. The box tail 130 further helps in this area. It is important for the vehicle to have a low wing 170 in order have a low CG. This configuration allows the visibility to be the same on the road and in the air.

Three-wheeled vehicles can be unstable if the CG falls outside a particular range. An imaginary line passing from one of the rear wheel's ground contact points to the forward wheel ground contact point represents the pivot line. Any time the CG gets outside of this line the vehicle may turn over. The angle from horizontal to a line drawn perpendicular to the imaginary line and intersecting the CG is the turn over angle. Keeping the CG aft, well centered and low in the vehicle improves this condition in a vehicle with a single wheel in the front. Having the wing 170 low, the landing gear 140, 150, 160 low, and placing all the primary loads in a single area performs this function.

In order to license the vehicle for ground operation in some States it may be necessary for the vehicle to have Mirrors located on both sides for the purpose of viewing rear traffic in ground mode. Remote cameras and monitors may be used to meet the viewing requirements, or the curvature of the fuselage may be so arranged that the mirrors are located inside the vehicle window 281 at the apex of the curvature of the fuselage, eliminating the need for retractable or removable mirrors by placing the mirrors within the aerodynamically faired fuselage/windows 280.

Figure 9:
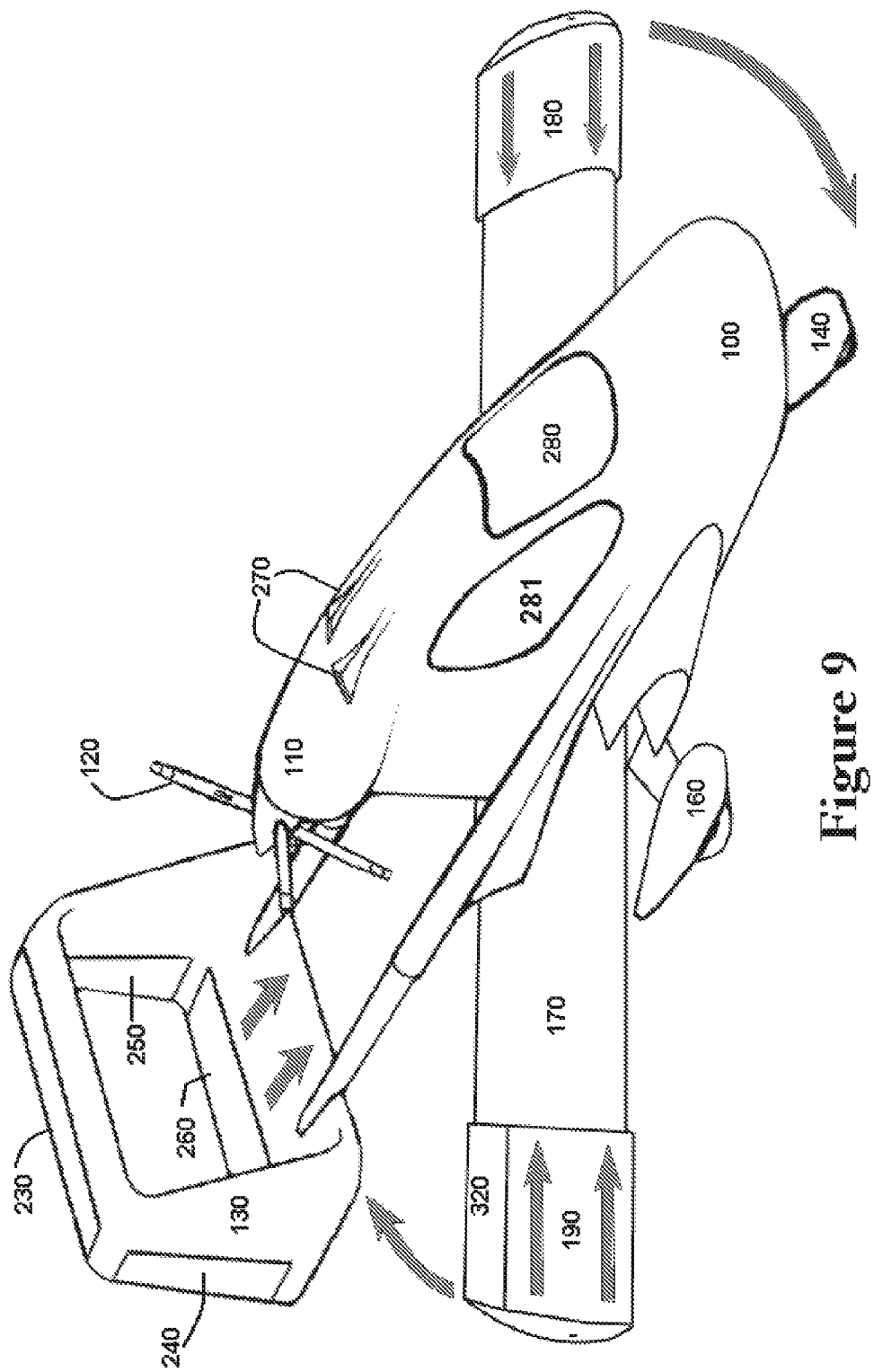
FIG. 9 is a perspective view of the roadable aircraft of the present invention illustrating the transition from aircraft mode to road mode, illustrating the wings rotating into position for driving with the wing tips retracting and tail booms retracting.
Figure 10:
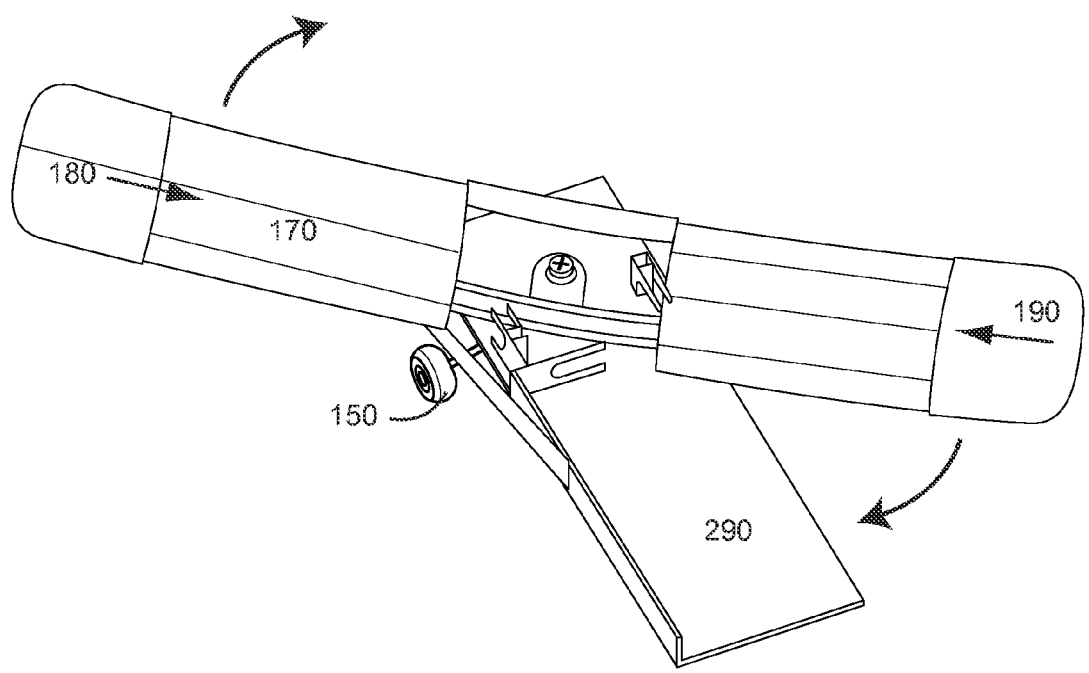
FIG. 10 is a perspective view of a portion of the roadable aircraft of the present invention illustrating wing pivot mechanism in transition from aircraft mode to road mode, illustrating the wings rotating into position for driving with the wing tips retracting and pulling the wing door to the closed position.

The purpose for pivoting the wing 170 is to reduce storage requirements and to orientate the wing along the natural longest dimension of the vehicle 100. This provides natural alignment to the vehicle for aesthetic and CG improvement. The single piece wing 170 rotates around a skewed pivot in the lower portion of the fuselage as illustrated in FIG. 9. FIG. 10 is a perspective view of a portion 290 of the fuselage of the roadable aircraft of the present invention illustrating wing pivot mechanism in transition from aircraft mode to road mode, illustrating the wings rotating into position for driving with the wing tips 180, 190 retracting and pulling the wing door to the closed position. Skewing the pivot provides a simple lightweight method to allow the wing 170 to rotate and align the dihedral of the wing 170 to the natural lines of the vehicle providing an aesthetically pleasing shape. Having the wing 170 below the fuselage keeps the CG low for good ground handling and the visibility is unaffected. These two factors make the placement of the wing 170 preferable to a wing 170 that is positioned above the fuselage. The single piece wing 170 has a fixed dihedral and will rotate about a skewed pivot.

Figure 12:
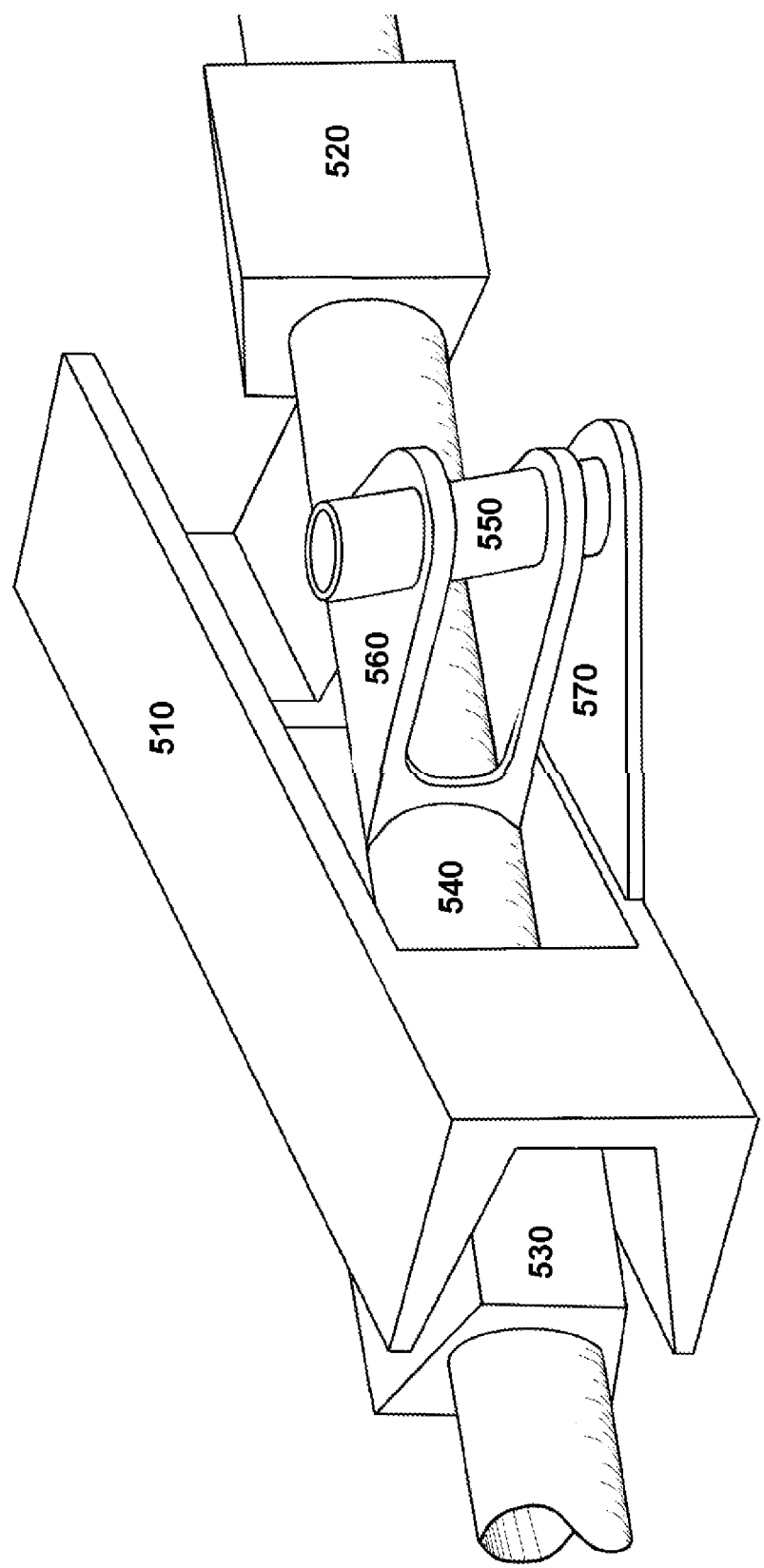
FIG. 12 is a perspective exaggerated view the center wing box, illustrating how the box that holds the spar in place during aircraft mode is slightly tapered so that the box has low friction until nesting in its enclosure.

For example, as illustrated in FIG. 12, a pivot 550, connecting trunion 560 to wing spar 540 to flange 570 on the fuselage, may be skewed 5 degrees to the right and having 5 degrees of dihedral in the wing 170 and rotating clockwise will allow the left side of wing 170 to swing to a horizontal position under the front fuselage and the right side of wing 170 will be approximately 10 degrees above horizontal behind the fuselage at the same time the wing angle of incidence will reduce by 2.5 degrees. Note that while in the preferred embodiment illustrated, the angle of dihedral and the skew of the wing pivot are equal, other angles may be used within the spirit and scope of the present invention. The overall concept is to use the skew in the wing pivot to offset the dihedral angle to allow for compact stowage of the forward wing portion while angling the rear portion. The reduction in wing incidence allows the wing storage area to be reduced. The increase in angle of the now rear wing 170 will allow the interconnected fuel stored within the now rear wing 170 to flow down into the lower front wing, moving the CG both forward and down, improving the stability for ground operations. This will happen without the need of the operator to open or close valves. Moving the CG forward avoids a bad aft CG position that could cause turn over in high wind or adverse road conditions.

The left side of wing 170 (forward side when folded) will be fully enclosed by the fuselage and a door 200 on the left side. This will not only improve the aesthetics of the vehicle 100 on the road but also protect wing 170 from rock chips and door dings. The right side of wing 170, when folded, is higher off the ground and nested between twin tail booms 210, 220 providing protection from rock and door dings on the ground. This blocks off the area to the propeller 120 from the rear, preventing pedestrians from entering the plane of propeller 120. Further, because wing 170 is below propeller 120 the air will always be clean entering the propeller 120 preventing stones from being thrown by the blast of propeller 120. While in the preferred embodiment illustrated shows the wing 170 open, it should also be realized that within the spirit and scope of the present invention, the wing 170 might be enclosed like the front portion is done. The skewed pivot provides a simple lightweight method for retraction that provides many benefits. The single switch operation means the operator does not have to leave the vehicle to fold the wing 170 during inclement weather. The retracting mechanism is of low weight and may be constructed from common materials. The drag load on one side of the wing 170 tends to lock the wing 170 while the drag load on the other side of wing 170 tends to unlock the wing.

The net effect is that the load on the locking mechanism is near neutral therefore, eliminating the need for heavy locking mechanisms. A single electric actuator may be used to operate the wing 170 in a push button operation. Because the wing 170 is constructed as a single piece the bending loads are carried in the wing 170 eliminating heavy fittings in the fuselage. The high structural loads are combined in a single area. That is the wing loads, main gear loads, engine loads and tail attach are all with in one local area allowing a single area to be beefed up instead of several different areas through out the aircraft. The single tubular spar 540 is carrying both bending loads and torsional loads eliminating the need for drag fittings. This method of folding wing 170 allows the view from the cockpit to remain the same for flight or road usage. The folded wing 170 also reduces the possibility of aircraft blow over during bad weather conditions when the aircraft 100 is tied down outside. In addition, the aircraft 100 can be stored in a standard automobile garage or even storage unit, as opposed to a large hanger required for conventional aircraft.

While the above explanation and FIG. 10 shows the wing 170 rotating in a clockwise rotation for conversion to car mode as viewed from above, it should be understood that the vehicle 100 could be built to rotate counter clockwise as well. In a preferred arrangement the center wing box will contain draft. In other words, the boxes 520, 530 that holds the spar 540 in place during aircraft mode is slightly tapered so that the boxes 520, 530 have low friction until nesting in enclosure 510, as illustrated in FIG. 12. A circular cross-section spar arrangement would also do this but there is only a small area of contact to transfer the flight loads to the box 510. For that reason a square or quadrilateral shape for the center section 530, 520 of the spar 540 is preferred in order that during nesting the outside surface can transfer the loads over a much larger area. Because the wing loads going into the fuselage are not symmetrical and landing gear loads are near the wing attachment point, a novel method for transferring these loads is needed, as illustrated in FIG. 12.

To resolve this problem the box enclosure 510 should be made from a material with high modulus of elasticity such as carbon graphite. The C-shaped structure 510 is constructed in a lightweight manner by using both unidirectional graphite and bi-directional material with a lightweight core such as high-density urethane foam. The wing control system provides the pilot with pushbutton control of automated transition between road and flight configurations, and prevention of intersecting operations during transition and flight through continuous logic-controller computer monitoring and control. The wing control system also enables/disables auxiliary ground/Flight equipment based upon the operational mode requirements.

The wing control system programming establishes three modes of operation: Transition, Flight, and Road. Pushbutton control simplifies the operation of the system and allows for a familiar interface between the operator and the system. The wing control system also allows the pilot (operator) to readily identify how the vehicle is configured and where all of the components are positioned. This is accomplished by the illumination of a lights on a display panel that represents where the wing/control surface is positioned.

The brain of the wing control system is a programmable logic controller (PLC) computer. The PLC continuously monitors inputs from operator switches and sensor inputs. Based upon the inputs and PLC programming, the PLC updates outputs to control the transition between road and flight modes, to prevent intersecting operations, control flaps and tips in flight, and control power to auxiliary equipment in road and flight modes.

Transition mode provides automated control of the opening and closing of the wing door 200 on the fuselage, the wing extension/retraction pivot 550, and the tail boom 210, 220 extension/retraction. To enter Transition mode, the operator arms a first switch then presses and holds a second protected momentary switch. The parking brake must be set and vehicle movement must not be detected. These conditions are a safeguard to prevent flight with the wing 170 partially engaged or entry into Transition mode during flight and to prevent operation while traveling down a highway and possibly violating a Federal aviation regulation. The operator pushes the second protected latching Transition Switch to enable the transition to extend or retract the wing 170 and tail booms 210, 220 simultaneously. This dual-switch configuration prevents power from accidentally being applied and the possibility of the wing actuator moving inadvertently.

While the operator holds the momentary switch, the door 200 automatically opens before wing movement is allowed. When the door 200 has fully opened, the wing 170 then begins to pivot. Simultaneously, the tail booms 210, 220 may automatically extend or retract, or they may be extended or retracted in a separate operation. When the wing 170 and tail booms 210, 220 have fully extended or retracted, sensors send feedback to the PLC to cancel the control signal. The wing door 200 automatically closes. When the operator observes indicators that the wing 170 and tail boom have reached the limits of travel, the operator releases the momentary switch, and door 200 locks automatically.

Flight mode is enabled when wing 170 is in the fully extended position. In Flight mode, the PLC controls the movement of the wing tips 180, 190 and flaps. The wing tips 180, 190 must be fully extended before the flaps (not shown) can be lowered. Conversely, the flaps must be fully retracted before the wing tips 180, 190 can be retracted. When the flaps are fully retracted, the wing tips 180, 190 may be extended or retracted incrementally. Full extension or retraction is indicated by the illumination of a lights on a display panel.

Flight mode also enables the buss for operation of equipment required for flight, such as navigation lights, strobes, pitot heater, and the like. Road mode is enabled when the wing 170 is in the fully retracted position. In Road mode, the PLC enables the buss for operation of equipment required for street use, such as main wheel motors, horn, turn signals, lighting, and the like.

The telescopic wing tips 180, 190 provide a reduction in wingspan in order to reduce wing storage requirements and also to provide a method of in-flight wing morphing. In addition, the telescoping wing tips 180, 190 may provide a method to symmetrically operate the wing tips 180, 190 as a means of Drag reduction or asymmetrically as a means of control or trim. Additionally, the present invention provides a method to retract the wing tips 180, 190 that is cost effective, lightweight while using high production manufacturing methods. In order to accomplish this it will be necessary to have the aileron operable at all times. The telescopic portions 180, 190 of the wing 170 is at the tip where the aerodynamic wing loading is the lowest point therefore the mechanism may be lightweight.

A new approach was taken to the old concept of a variable span wing by developing a very simple telescopic spar system. The wing 170 is composed of a high-speed (low drag & strong) central wing 170 section with completely retractable high lift wing tip sections 180, 190, which move in a spanwise direction as opposed to the chordwise direction of conventional flaps. It is the same concept of changing lift with conventional chordwise flaps except that the spanwise tip increases span & area instead of only the camber. It also increases the aspect ratio instead of decreasing it, which greatly improves efficiency and safety. When retracted, the low drag wing 170 reaches a high cruise speed. When extended, the stall speed is lowered. The low landing speed compliments the gear's ability to land dissipate energy.

Figure 11A:
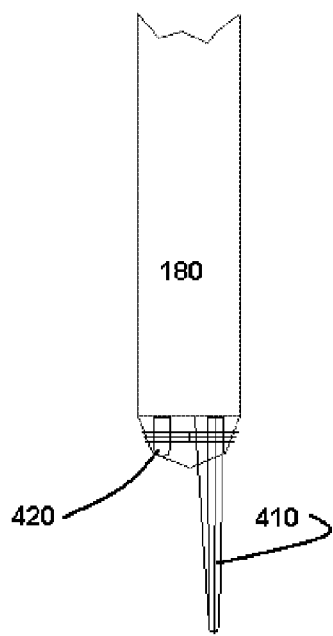
FIG. 11A is a front view of the wing-tip mounted Dual extendable Ailerions of the second embodiment of the present invention.
Figure 11B:
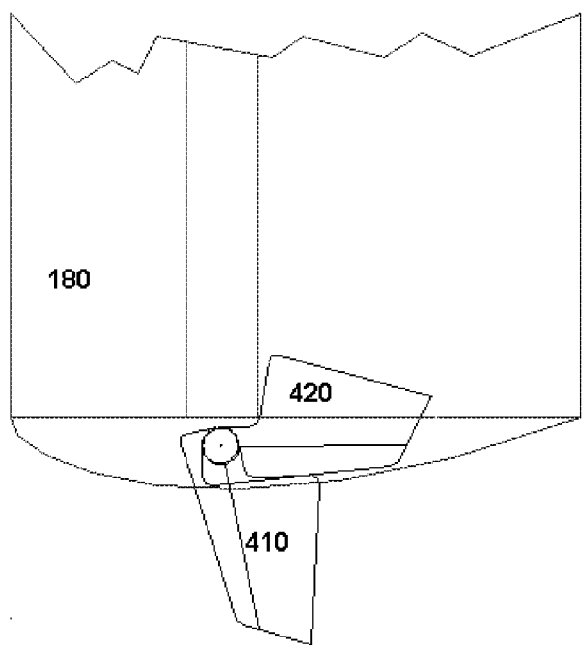
FIG. 11B is a top view of the wing-tip mounted Dual-A-Rons of the second embodiment of the present invention.
Figure 11C:
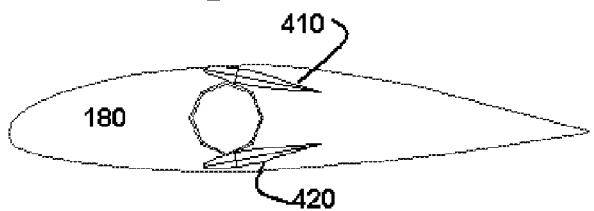
FIG. 11C is a side view of the wing-tip mounted Dual-A-Rons of the second embodiment of the present invention.

During takeoff & landing the high lift airfoils may be extended at the wing tips 180, 190. When transitioning to a high-speed cruise, they may be retracted in flight to leave a high-speed low drag wing 170 capable of withstanding high 'G' loads. This system is simple, rugged, and fail-safe. The aircraft can also maneuver in flight and land safely with the wings in any position from fully extended through fully retracted. The extension/retraction mechanism uses a simple system of cables that prevents asymmetric extension. Ailerons 410, 420 may be located on both sides of the tip extendable sections, as illustrated in FIGS. 11A-C and are fully functional at all times during the extension/retraction process. The airfoils shown in drawings are modified Ga 37315A sections.

Figure 18:
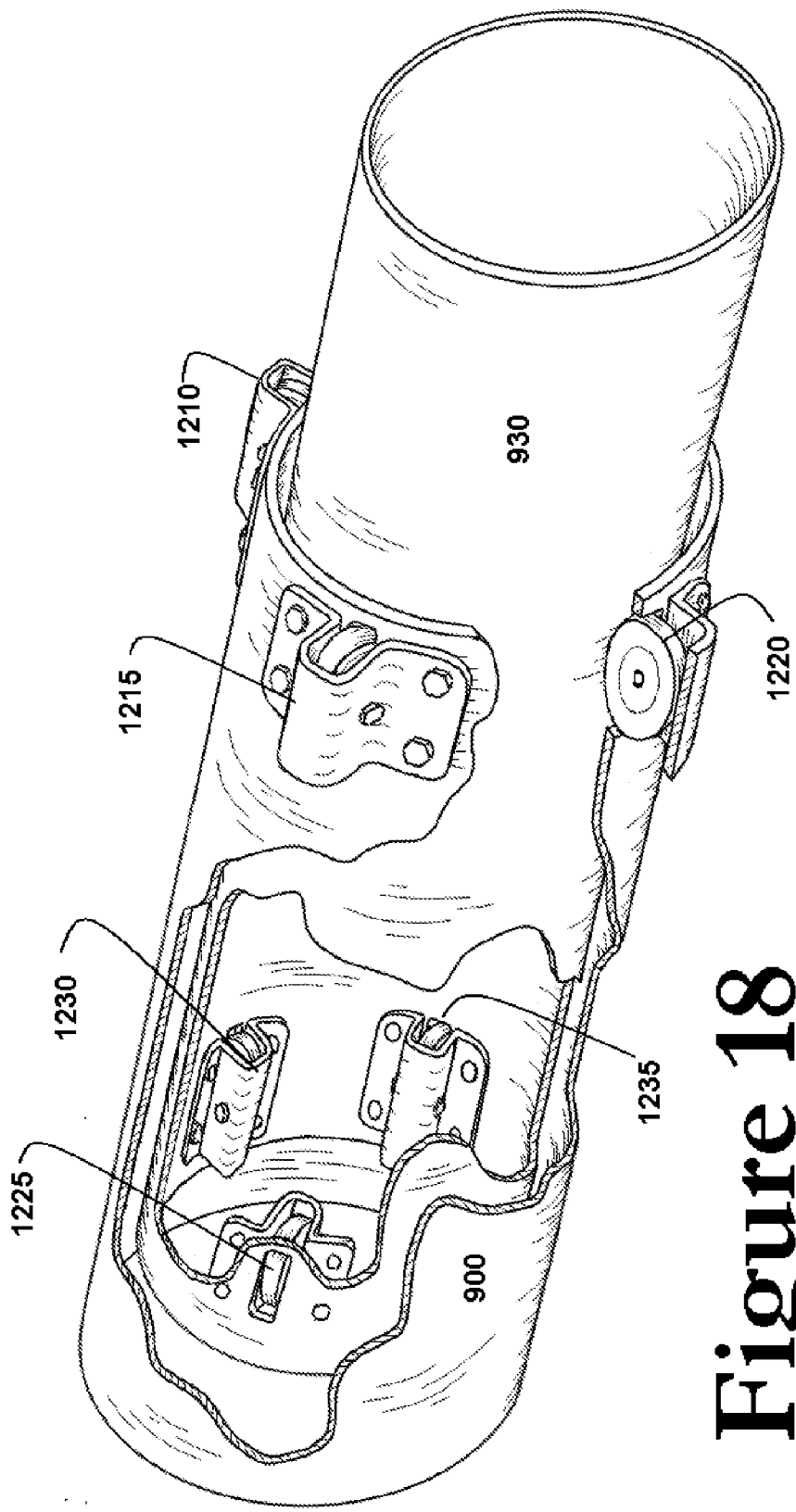
FIG. 18 is another cutaway view of the extendable spar illustrating the preferred arrangement of rollers used to allow the spar and hence wingtip, to extend and retract.

The mechanism is simple and reliable. As illustrated in FIG. 18, the extendable section spars 930 are guided on rollers 1210, 1215, 1220, 1225, 1230, 1235 to increase the span. Binding under load during transition is prevented by the details of the roller system as will be discussed below. This design is actually simpler than conventional high lift devices. The overall weight of this wing 170 is comparable to that of a conventional wing for a similar size aircraft that is required to produce the same speed range, however, it is stronger and more efficient than the conventional wing. When retracted, this wing's strength puts it in an Aerobatic category (6.0 g's), and when extended, it is in the Normal category (3.8 g's).

Comparing conventional and telescopic wings, the following is a simplified comparison of conventional and telescopic wings to show the concepts involved. Conventional flaps and other high lift devices can be applied to both wing types with equal effects. In order for the conventional wing to match the low stall speed of the telescopic wing, it would need a planform area and span similar to the extended telescopic wing (which is relatively large). As speed is increased, less wing area is needed to produce the required lift. So, for a conventional wing, at high speeds there is a lot more wing exposed to the high aerodynamic loads than is required. For this large conventional wing to be strong enough to reach the high cruise speeds that the retracted telescopic wing can achieve, it must be exceptionally strong, which means a heavy structure.

The telescopic wing, on the other hand, has only the inboard wing section (75% of the span) exposed to the high aerodynamic forces in cruise, which reduces structural weight. Since retractable high lift devices such as flaps and the extendable wing sections 180, 190 are only used at low speeds, they do not need to withstand the high aerodynamic forces that exist at cruise speeds and they can be made lighter. Because a conventional wing is a compromise between the large low speed wing and the short high-speed wing, its performance is also compromised. The telescopic wing does not compromise its performance and can reach lower stall speeds and higher cruise speeds than the conventional wing. The telescopic wing, including the telescoping mechanism (rollers, cables, and the like), is actually lighter than a conventional wing that reaches the same stall and cruise speeds. A conventional wing can be built slightly lighter than the telescopic wing 170 but it would not have the low stall speed or the tremendous strength at high speeds that the telescopic wing has.

A conventional wing uses flaps, and sometimes movable slats to reduce the stall speed to that of the telescopic wing. The telescopic wing 170 actually has fewer critical moving parts than a complex fowler flap does. A component failure is less likely to occur in the telescopic wing 170 and if it does, components are redundant and the design is also fail-safe.

Redundancy means that a single component failure such as an extension cable breaking does not affect the actuation of the wing. Fail-safe means that if multiple components fail the wings will simply stop in the current position. If this occurs, the aircraft can still fly, land, and maneuver with the wings in any position. Asymmetric extension is prevented by the design more so than with some conventional flaps. So the telescopic design is simple and safe.

Weight and drag are the obstacles to achieving high performance. Wing drag is the sum of two components, induced drag and parasitic drag. Induced drag is due to lift and parasitic drag is mainly due to surface friction. Increasing the size of a wing increases its parasitic drag. For low speeds the majority of the drag is induced drag and at high speeds it is parasitic drag. So the large wing that is beneficial for low stall speeds is detrimental at the high cruise speeds. Ideally, one would want to remove the extra wing area used at low speeds in order to reduce drag during cruise and increase speed and efficiency. This is exactly what is done with the telescopic wing. Another benefit mentioned in the weight section above is that removing the extra wing area from the high-speed air allows for that section of wing to be lighter because it does not need to withstand the high-speed forces. This weight reduction also improves performance. Rate of climb (ROC), range, endurance, ceiling, and the like with the wings extended are also greatly improved over a conventional wing. For the telescopic wing, these improvements do not come at the expense of cruise speed as in the conventional wing. Low speed performance benefits from the wings extended and high speed benefits from wings retracted (i.e., less power is required).

The wing extension control is simpler than for a normal flap. There is a single switch on top each horn of the control yoke. When these switches (connected in series) are both moved to the inside of the control wheel the wing tips 180, 190 retract. For safety reasons, if each is moved separately, nothing happens. Both switches should be activated for wing tips 180, 190 to extend or retract, in the preferred embodiment. When a single switch is operated nothing happens but when both switches are moved outboard the wing tips 180, 190 extend, which provides a natural interface for the pilot to allow the wing tips 180, 190 to move in an intuitive manner. The (Extend—Retract) switches control the wing tip position from fully extended to fully retracted. In the preferred embodiment, there are no intermediate settings. Ailerons 410, 420 or 310,320 are fully functional at any point during the extension process. Instrument panel indicator lights report fully extended, fully retracted, and intermediate wing positions. Both the flaps and the wing extensions 180, 190 have the same maximum extend speed limitations. Airspeed sensing limit switches may be used to prevent inadvertent extension at high speeds. The appropriate flap and wing extension airspeed range is marked on the airspeed indicator.

With wing tips 180, 190 retracted, there are many advantages to be had. Span reduction raises the wing strength to aerobatic rating. The smaller wing area improves ride quality in rough air. Storage space is also minimized. The smaller aileron arm provides light stick forces at high speeds. The design can simulate high performance jet aircraft for economic pilot training. The design may also be used as test vehicle for full scale aerodynamic testing of new wing geometries on the extension sections. The overall drag reduction improves speed and efficiency.

With the wing tips 180, 190 extended there are many other advantages as well. The rate of climb is improved. Endurance (maximum time in the air—search and rescue, surveillance) is improved. Range (maximum distance covered) is improved. Absolute and service ceilings (mountain clearance) are raised. Glide distance is increased and best glide speed is lowered. Touchdown speed is lowered. Takeoff and landing speeds are reduced. Takeoff and landing lengths are reduced (STOL capabilities). Landing impact energy is greatly reduced. Extra aileron moment improves handling and control at low speed. Extended wings rather than high lift flaps allow the horizontal tail to operate at a low angle of attack (downwash)—better protection from ice accumulation.

Figure 15:
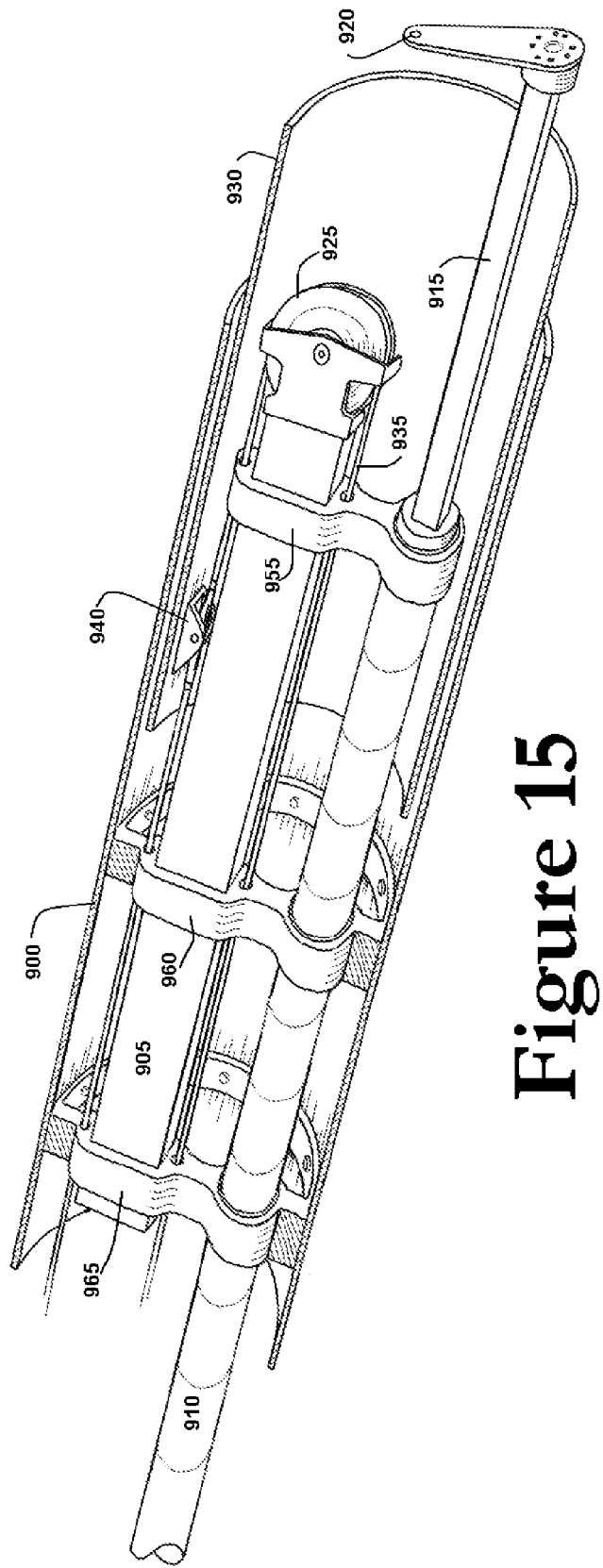
FIG. 15 is a half cutaway view of the extendable spars, illustrating the cable mechanism used to extend and retract the spar and hence the wing tips. Also shown Is the support structure for the Internal strut and the devise which transmits torque to the roll control devise during wing tip movement Support rollers not shown
Figure 19:
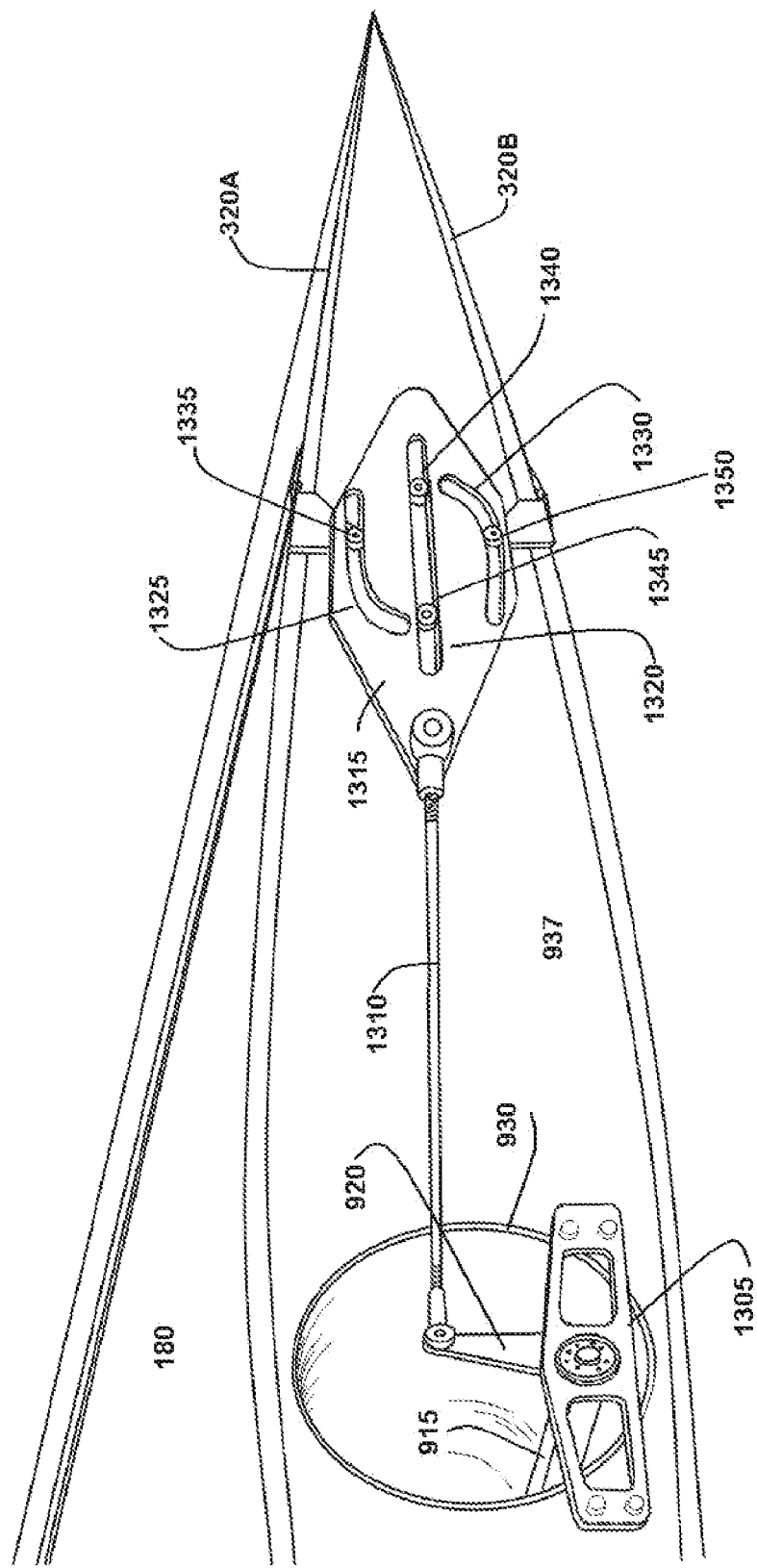
FIG. 19 is a side perspective view of an exposed wing section, illustrating the use of dual split flaps (dual-a-Rons) and the control mechanism for same, with both flaps retracted in the neutral position.
Figure 20:
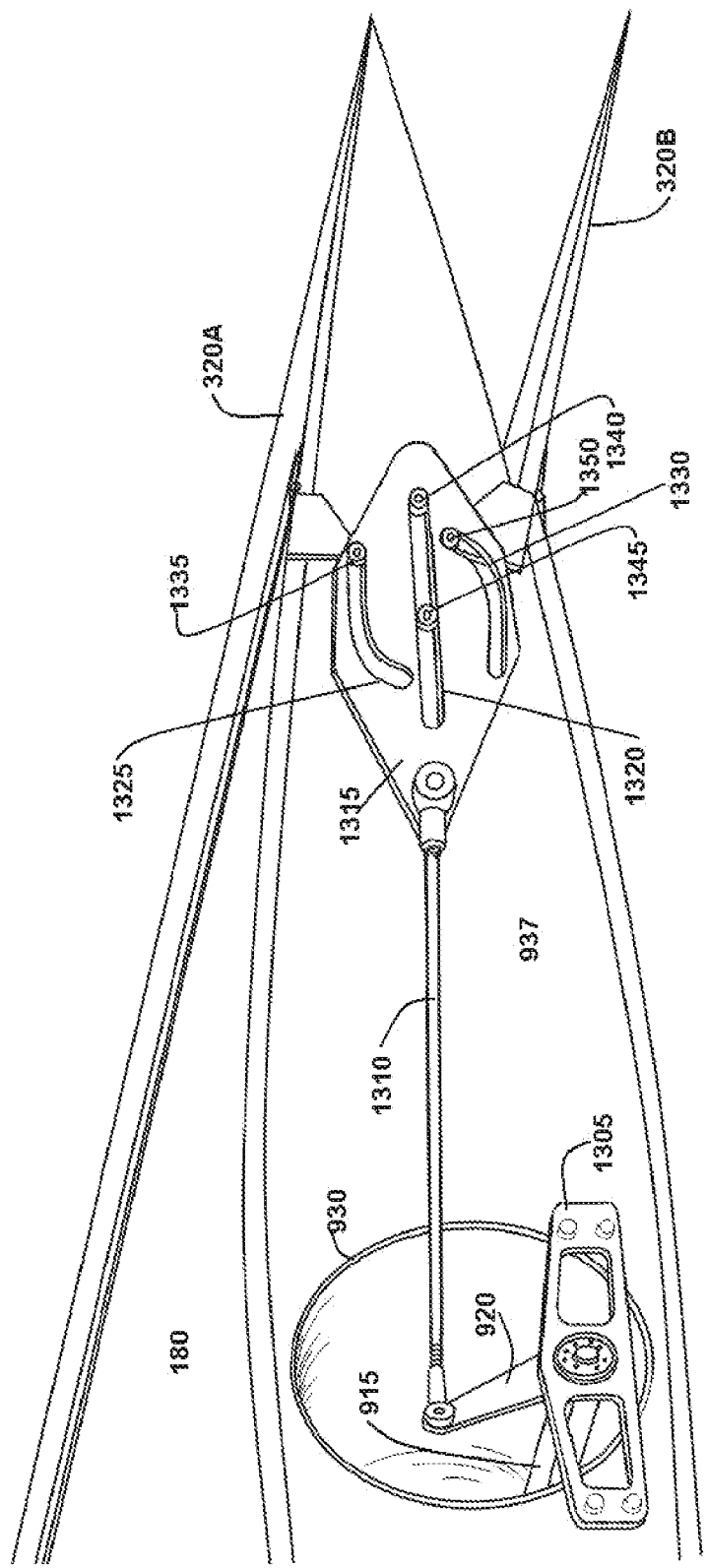
FIG. 20 is a side perspective view of an exposed wing section, illustrating the use of dual split flaps and the control mechanism for same, with the lower flap extended.
Figure 21:
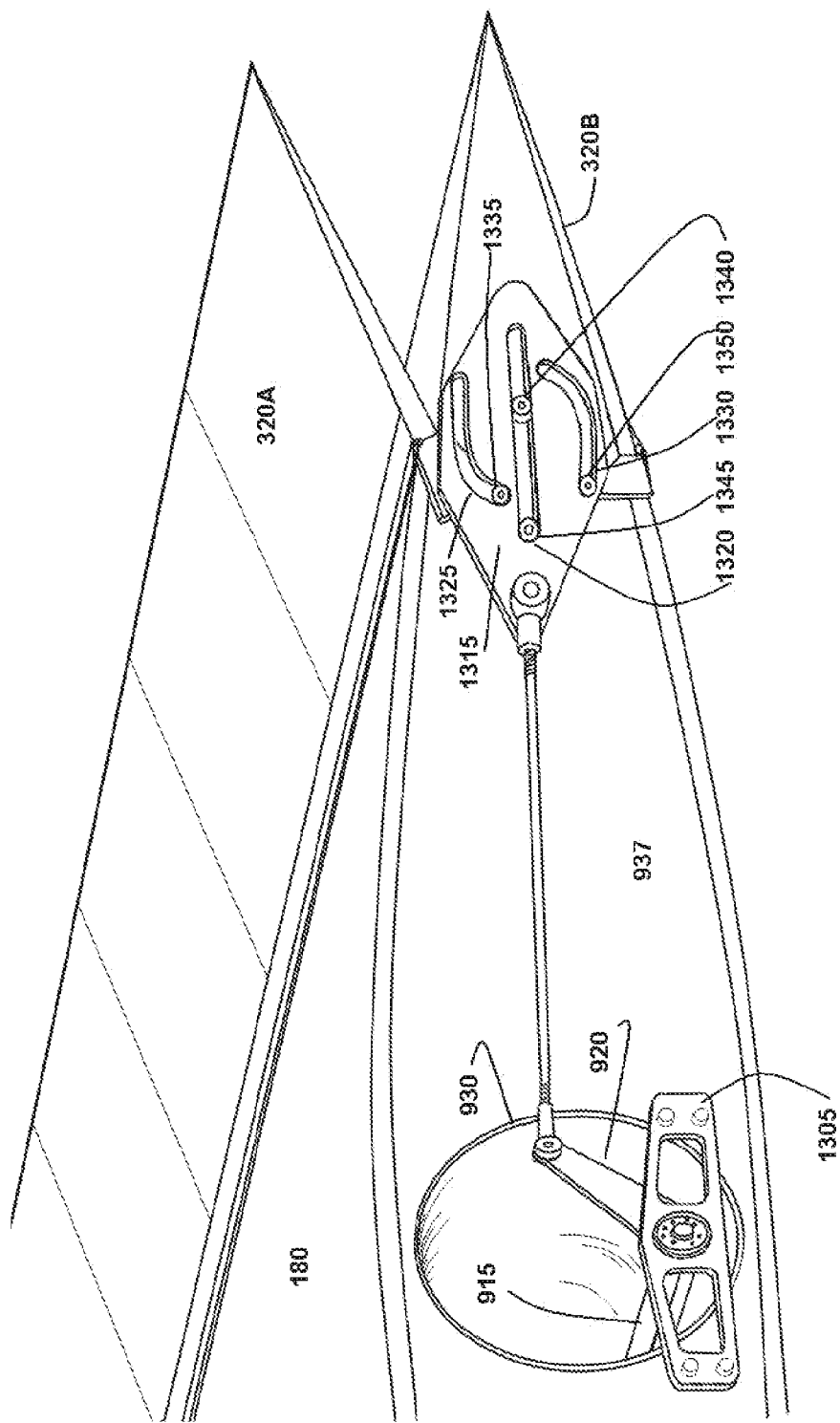
FIG. 21 is a side perspective view of an exposed wing section, illustrating the use of dual split flaps and the control mechanism for same, with the upper flap extended.

Telescopic wing tips 180, 190 comprise rib panels (thick and rigid wing skin connected to a single rib 937 at the outboard end). The panels move in and out on single concentric tubular elements 900, 930 as illustrated in FIGS. 15 and 18. The wing tip rib panels utilize a tubular spar 930 slightly smaller than the main wing spar 900. The wing tips 180, 190 are attached to the wing tip spars 930 only at the end rib 937 as illustrated in FIGS. 19-21. Rollers 1210, 1215, 1220, 1225, 1230, and 1235 arranged in a preferred order separate the tubular elements from each other as illustrated in FIG. 18. There may be two groups of four rollers each (three of each group, 1210, 1215, 1220, and 1225, 1230, 1235 are illustrated in FIG. 18 for clarity) and their path may be oriented such that to the vertical load on the wing 170 the rollers are oriented at the 45 degree position. This preferred position allows the bending loads of the wing 170 to be shared by two large diameter rollers at all times allowing the roller rating and track bearing surface to be reduced and the safety to be increased. Additionally this arrangement reduces the clearance to the outside skin, enabling the maximum spar depth and increasing moment of inertia of the spar. The roller are located at 45 degree to the spar, which allows any dirt to fall to the bottom out of the way of the roller path.

An additional important point about the location of the rollers 1210, 1215, 1220, 1225, 1230, and 1235 is that the outer tube 900 has its four rollers (1225, 1230, 1235 and one not shown for clarity) located externally at its extremity and the other inner tube has its four rollers (1210, 1215, 1220, and one not shown for clarity) located internally at it extremity which allows the rollers to be at the maximum distance apart no matter what the position of the tubular element therefore increasing the available moment arm and increasing safety.

The wing tips 180, 190 possess fail-safe features in that if a roller 1210, 1215, 1220, 1225, 1230, and 1235 fails, the inner tube 900 will simply rest against the inside of the outer tube 930 a short distance away. The primary load of the wingtip is carried on the rollers 1210, 1215, 1220, 1225, 1230, and 1235 but glide rings are located a short distance between the tubular elements so that in the event a roller fails the tip load is immediately captured by these low friction rings and the flight may continue to a place of repair with only slight increase in friction of the system. The wingtips 180, 190 are pulled in and out with a cable 935 as illustrated in FIG. 15. Cable 935 is wrapped around a pulley 925 placed at each end of the main wing spar 900. Pulley 925 is held at the end of a long internal strut 905. Strut 905 is braced to the main wing spar 900 by internal strut supports 960 and 965 a distance a little more than the wing tip retraction distance. This allows the wing tip spar 930 to retract into the main wing spar 900 without hitting the internal strut supports 960 and 965.

The cable 935 is then attached to the inside wing tip spar tube 930 at bracket 940. As the cable 935 is pulled one way, it extends wing tip (180, 190) and the other way it retracts the tip (180, 190). Various methods of actuation may be used including electrical, manual, pneumatic or hydraulic, or the like. Wing tip tubes 930 and therefore the wing tips 180, 190 are pulled along as well. The cable 935 which moves the right wing tip 190 is also the same cable 935 that moves the left wing tip 180 but the cables cross so that the wing tips 180, 190 move out together and in together at the same rate. The struts 905 are inside the spars, well protected from environmental concerns. The outboard end is also assisted by support of the aileron control tube 910. These strut supports 960, 965 are symmetrical left and right and cut by the water-jet manufacturing process to allow small parts count and reduce manufacturing requirements. The Support structure for the internal strut 905 proves a natural stop for the retracted inner wing tip spar 930. The outer stop can be a simple tube placed around the cable 935 of the proper length. From a structural concept, the tubular element of the wing tip spar 930 carries the bending loads, and the torsional loads are transferred into the rib panel 180, 190 where they transfer to the main wing structure through overlapping of the main wing structure 170 and its ribs. Additionally it should be realized that interlocking groves in the tubular elements might be use to transmit the torsional forces as well.

An external rib at the inboard end of the rib panel 937 may provide a natural stall fence reducing the effect of stall moving out over the roll control surfaces during partial stalled wing condition. Ailerons 320A, 320B may be connected at all times by utilizing a telescopic torque tube 915 located in the wing spar 900. Four rollers may be placed radially around the outside of a square tube 915, which is connected to the pilots input system. The rollers may be attached to a circular tube 910 whose outboard end is connected to the aileron mechanism. The rollers allow the square tube 915 to easily telescope in and out of the larger round tube 910 but still allow torque to be transferred between the tubes. Advanced designs of these wing tips 180, 190 may be moved in an unsymmetrical method for flight control. While this tip is shown to be external as a preferred method it should also be understood that the tip could operate equally as well from the inside. A hole may be placed in the leading edge that routes air between the retractable tip and the wing surface to form an air bearing for smooth operation Because the wing tips 180, 190 slide over the outside of the wing surface the control surfaces (Conventional ailerons) can not pass through the surface so an alternative method of control is needed. Referring to FIGS. 11A-C and FIGS. 19-21, Dual-A-Rons dual ailerons and dual split flaps, respectively, provide a simple way to provide roll control for telescopic wings that may be used during flight. These control surfaces, which may be used separately or in combination, eliminates folding mechanisms and the drag associated with external flaps. Dual-A-Rons (Dual ailerons 310A,B 320A,B) are a new type of lateral control devised for Aircraft that replaces existing ailerons. The Dual-A-Rons provide an advanced roll control device. This system may be designed into new designs or be adapted for use with existing systems and has the potential to increase safety and reduce structural weight. This fully developed system will allow the next generation of aircraft to be built with reduced weight, increased flexibility, and increased damage tolerance.

A second embodiment of roll control uses a pair of airfoils at preset angles of incidence relative to the cord to overcome this deficiency by raising the lift coefficient into a usable range. Additionally, by using a rotary motion for extension in place of sliding it reduces the complexity of the system as well as frees up space within the wing 170 for other design features. By placing the control at the wingtip allows the surface to have maximum moment arm from the center of the aircraft. By placing the mounting point close to main spar of the wing 170 the torsional loads are much lower than a wing constructed with the aileron along the trailing edge of the wing.

Referring to FIGS. 11A-C, a second type of roll control System (Dual extendible ailerons) comprises two independent airfoils (Tipfoils) 410, 420 placed at the end of each wing tip 180, 190 of an aircraft. An important point is that each tipfoil 410, 420 is set at a preset angle relative to the cord of the wing. Each may be deployed separately into the air stream opposing the opposite wing tip tipfoil 410, 420 deployment for the purpose of lateral control of an aircraft. Dual extendible ailerons have some distinct advantages over standard ailerons. The tipfoils 410, 420 in neutral position remain within the structure where it is protected from hanger rash and other impacts such as bird strikes. The tipfoils 410, 420 are at the end of the wing, giving maximum moment arm and therefore maximum effectiveness. The flaps may be extended full length to the tip allowing slower stall speed. The wing structure may be made lighter, due to the tipfoils 410, 420 being mounted near the spar the torsion load on the wing 170 is reduced. Fuel may now be carried in the area previously take up by ailerons. Morphing and telescopic wings have a new way for lateral control allowing lightweight designs due to reduction in torsional requirements. Because the surface is not floating on a hinge the surface is less likely to flutter. No counter weight is needed to balance the surface so the surface may be constructed lightweight. Normally a wing stalls from the root to the tip by placing the control outside of the stalled wing will allow full control with a fully stalled wing. Highly energized wing tip vortex may assist in providing positive control at high angles of attack. Preset angle may be used for "differential" control to offset the effects of adverse yaw. With increased extension of tipfoils 410, 420 the lateral force is greater as the tip aligns its self with the wing spar reducing torsional moments into the spar. Because there is no aileron on the trailing edge there is less chance of "aileron reversal" from the wing torsionally warping in the opposite direction during high-speed flight. Deicing controls currently in use for propeller and wing surfaces may be applied to these surfaced both electrically and pneumatic. While 11 A,B,C Show the tip foils operate using a rotational motion with in the scope of this invention it should be understood that other methods of operation such sliding tracks might be used as well.

NACA Investigated Extensible Wing tip Ailerons in its document RM L9H04 dated Sep. 20, 1949, and incorporated herein by reference. In that report a single airfoil is extended parallel to the cord on a single side for the purpose of roll control. In Summary it was discover that the results indicated that the aileron control was sufficiently effective at moderate and high lift coefficients but was deficient at low lift coefficients. By placing the tipfoils at preset angles automatically raise the lift coefficient into a usable range The 3-view drawings of FIG. 19-21 depict one possible configuration for use of this new system on a fixed wing aircraft. Dual-A-Rons dual split flaps 320A, 320B are located on the upper and lower aft surfaces of the telescopic wing tip glove 170. The structure between them remains a structural part of the wing or wing tip that is sealed. The wing tip glove skin (Rib Panel) wraps completely around the main wing skin. Common ailerons such as plain and Freise type pivot through the structure of the wing or wing tip. Flaps such as the External or Junkers flap are external to wing and while highly effective would require some folding mechanism for conversion to road mode. It may be undesirable to pivot the aileron through the structure because it limits the available structural surface to the wing, which the tip must slide over.

FIGS. 19 and 21 illustrate the embodiment of the Dual-A-Rons of the present invention using split flaps. FIG. 19 is a side perspective view of an exposed wing section, illustrating the use of dual split flaps and the control mechanism for same, with both flaps retracted. The details of the extendable control mechanism are illustrated in FIG. 15 as well. FIG. 20 is a side perspective view of an exposed wing section, illustrating the use of dual split flaps and the control mechanism for same, with the lower flap extended. FIG. 21 is a side perspective view of an exposed wing section, illustrating the use of dual split flaps and the control mechanism for same, with the upper flap extended.

Split flaps are known for their high lift production when used as flaps. In order to use a pair of split flaps for roll control, the controls should be such that when the pilot puts in roll control, the control moves in the proper direction. By way of example if the pilot put in left roll control the Dual-a-Rons on the left wing would move in the following manner. The top split flap 320A would be up and the bottom 320B would remain against the wing tip 180 surface. As the pilot reduced input the top split flap 320A would eventually lower to lay flush with the top surface of the wing tip 180 and both split flaps 320A, 320B would neutralized and against the surface. If the pilot continued his input now for a right roll the bottom split flap 320B on the left wing will start to actuate and move down while the top remains flush with the upper surface. The two split flaps 320A, 320B must be synchronized such that this movement is without slop, smooth, and without delay so that two ailerons are acting aerodynamically as one.

The mechanism that does this is a flat plate 1315 machined by water jet with one straight track 1320 in the middle and two opposing J-shaped tracks 1325, 1330, as illustrated in FIGS. 19-21. The center track 1320 allows the fitting to translate in a constant plane as it slides along guides 1345 and 1340. Upper flap 320A is coupled to the upper J-track 1325 by guide 1335, while lower flap 320B is coupled to lower J-track 1330 by guide 1350. For the sake of illustration, the mechanism for the other wing tip 190 is not illustrated here. Flat plate 1315 may be controlled by link 1310 coupled to control arm 920 that attaches to torque tube 915. The flat portion of the opposing J-tracks 1325, 1330 is used to hold the split flap to the surface and the end radius controls the angle and degrees of movement of each surface. In the event that no differential movement is desired between top and bottom this plate may be made symmetrical for commonalty of parts by flipping over for the opposing side operation. This makes the operating mechanism simple to construct and lightweight. This also allows the wing tip to slide over the wing and the ailerons to operate at all times. The Dual-A-Rons fit with in profile of wing providing low drag. Dual (split flaps) provide increased roll effectiveness due to the power of split flaps. Due to the fact that the Dual split flaps are thin in section and must support high torsional loads they may be made from materials with high stiffness such as Carbon graphite.

Referring back to FIGS. 1-11, there are several reasons for having a twin boom 210, 220 telescopic box tail 130. What is needed is a tail that makes the aircraft easy to fly while at the same time reducing storage requirements. To accomplish this goal a large tail volume is needed during the flight mode and a reduced volume during ground mode. A tail that negates the pitching effects of thrust application is also desirable.

Box tails are more commonly found on bombs that are dropped from the air and there is a need to stabilize the path of the bomb while at the same time having space constraints. The box tail 130 is efficient because all the tips of the surfaces are sealed and therefore the effective span of each is greater. The box tail 130 allows a large tail volume in a small area. Additionally there are structural advantages for this arrangement as well. Stiffness is important for the telescopic elements in order to prevent binding associated with one tail boom being out of sync with the other. A box structure is stiff allowing the use of telescopic tail booms 210, 220 without binding because the booms 210, 220 always remain parallel avoiding a undesirable coupling. The forward tubes are of larger diameter in order to reduce the bending moment of the tail boom.

The tail booms 210, 220 are pulled in and out with a cable. In a manner similar to that of the wing, as illustrated in FIGS. 15 and 18. In fact, the cables actuation methods my use commonality between parts as a method for cost reduction. There is a cable wrapped around a pulley placed at each end of the forward tube. The pulleys are held at the end of a long strut but the strut is not braced to the main wing spar for a distance a little more than the tail boom retraction distance. This allows the box tail 130 boom to retract into the forward boom without hitting the brace. The cable is then attached to the inside aft tail boom tube.

As the cable is pulled (various methods may be used), the tail is retracted. The cable which moves the right boom is also the same cable that moves the left boom but the cables cross so that the booms 210, 220 move out together and in together at the same rate. The internal struts allow the tail to move in parallel symmetrical synchronized operation, which avoids binding during retraction and extension. A mechanism at the end of the extended travel position of the tail acts as a over center mechanism for the main wing to lock it in place. The struts are inside the tubes, well protected from environmental concerns. These strut supports and braces are symmetrical left and right and cut by the waterjet manufacturing process to allow small parts count and reduce manufacturing requirements. Furthermore the tail booms 210, 220 share common parts with the wing tip operating mechanism previously described, further reducing manufacturing cost. The Support structure for the internal strut proves a natural stop for the retracted inner tail boom From a structural concept, the tubular element of the tail booms 210, 220 carries the bending loads, and the torsional loads are reduced by the interconnecting box tail 130. The telescopic tail may be supported on rollers in a similar manner as the telescopic wing tips 180, 190 previously described. Or for reduced cost, the booms 210, 220 may slide on low friction bearings such as nylatron or other low friction material. Groves cut in the bearing in the direction of sliding provide a place for dirt to travel and avoid damage to the sliding elements.

The arrangement of having twin booms 210, 220 means that common cross sections may be used for manufacturing. A box tail 130 in combination twin booms 210, 220 allows the stowed wing structure to be located such a way that no car doors can strike it and possibly damage it. Because the prop is above the stored wing and the box tail 130 is at the end of the wing and the tail booms 210, 220 are on each side it is difficult for pedestrians to enter the prop plane of rotation.

Aircraft with high thrust lines tend to pitch down with throttle application and up with throttle retard. This is opposite of most conventional tractor trainer type aircraft. The ideal situation would be that the horizontal stabilizer is located in line with the thrust line such to minimize the effect of throttle application. By correct waterline placement and angle of incidence of the box tail 130 dual horizontal stabilizers 230, 260 is such to minimize this effect this reduces the pilot work load and makes the aircraft easy to fly. Similarly, dual vertical stabilizers 240, 250 are provided on either side of box tail 130.

Figure 22:
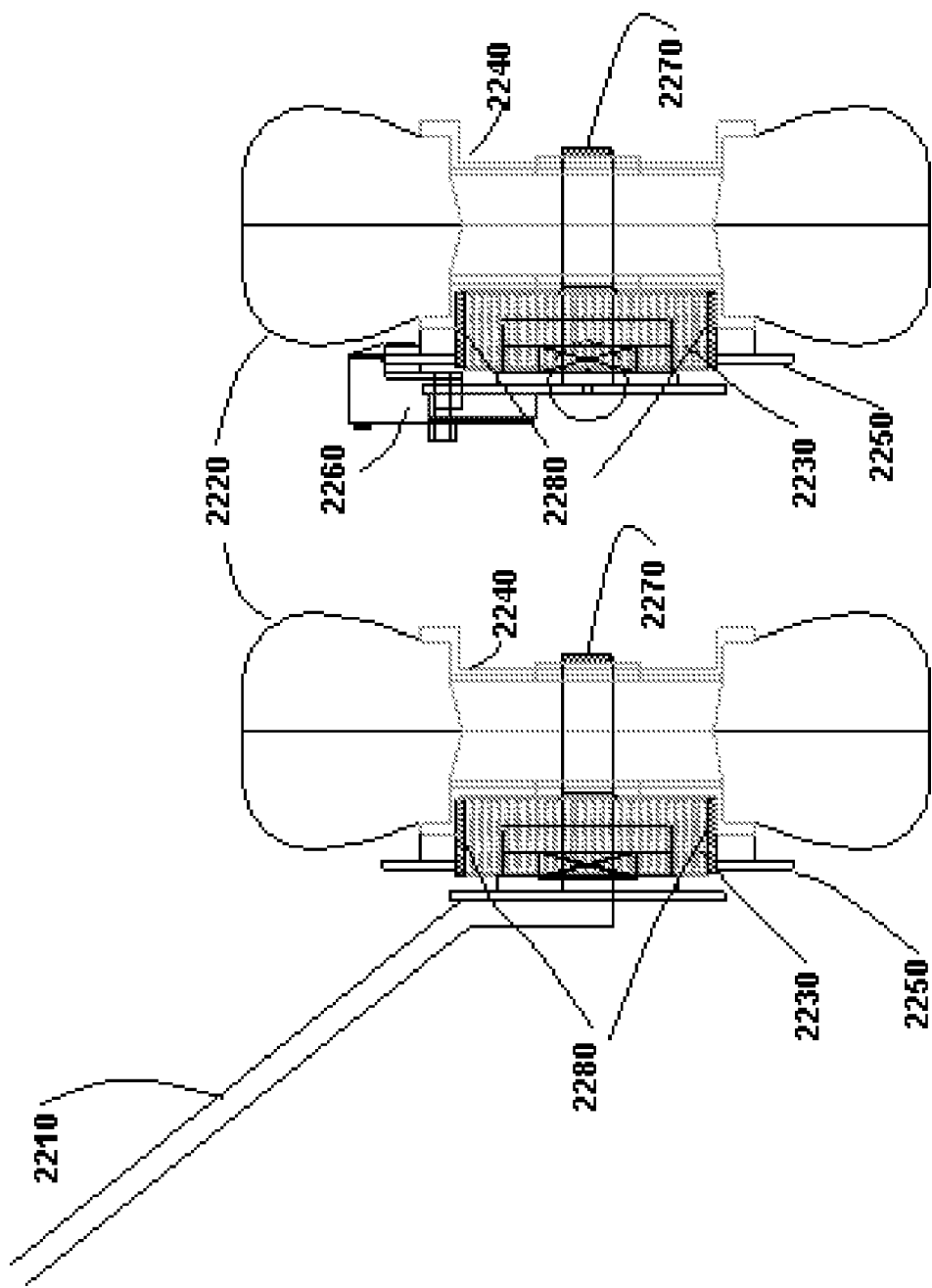
FIG. 22A is a front view of the wheel motor embodiment of the present invention.
FIG. 22B is a top view of the wheel motor embodiment of the present invention.

FIG. 22A is a front view of the wheel motor embodiment of the present invention. FIG. 22B is a top view of the wheel motor embodiment of the present invention. In this embodiment of the present invention, elector motors are provided within the wheels of one or more of landing gear 140, 150, 160, in order to propel the aircraft on the ground, either for purposes of parking or moving the aircraft, or as a primary means of propulsion in road mode. In addition the wheel motors may be used for regenerative braking, for wheel spin-up (prior to landing) and to assist in take-off by helping the aircraft accelerate. Referring to FIGS. 22A and 22B, landing gear strut 2210 supports axle 2270. In FIGS. 22A and 22B, one of the side landing gear 150, 160 are illustrated. However, the same wheel motor embodiment may also be applied to nose gear 140 if desired. Axle 2270 rotationally supports wheel 2240 on which tire 2220 is mounted. A conventional disc brake, comprising disc 2250 and caliper 2260 may be mounted, as is known in the art. Wheel mounted magnets 2280 may rotate with wheel 2240, while stationary windings 2230 may be mounted to axle 2270 and remain stationary relative to landing gear strut 2210.

A means is needed for moving the aircraft in and out of garages and short distances to areas away from pedestrians without the propeller 120 in operation may be desirable. Such a device should be lightweight, quite in operation and cost effective. In-wheel brushless hub motors, sometimes called wheel motors or hub motors provide a way to move the aircraft with out the use of clutch or transmission that provides forward and rearward movement. Wheel motors provide a quiet method to move the aircraft short distances at low noise levels; they may be used for forward or reverse without the use of transmissions. They may be used to reduce the amount of fuel burned during ground operations.

The preferred arrangement of these motors are that the armature 2230 or windings are stationary and the permanent magnets 2280 are mounted to the wheel 2240 so there is very little increase in wheel inertia affecting tire wear during touch down. Locating the permanent magnets 2280 outside the stationary windings 2230 and not rotating the windings 2230 does not affect the speed of the wheel 2240 in any hazardous way by centrifugal force. Low inertia allows the wheels 2240 to spin up easily during landing. Because the magnets 2280 are in the outer portion of the wheel 2240 the moment arm is long therefore having high starting torque, which avoids the use of gears or transmission to gain high torque. Torque is proportional to the square of the sum of the magnetic flux ($Øm$), of the permanent magnet rotor 2280 and the magnetic flux ($Øc$), of the stator windings 2230. High torque is generated due to the following factors.

First, the motor diameter is large. The tangential forces between rotor 2280 and stator 2230 act as a large radius, resulting in higher torque. Secondly, a large number of small rotor magnets 2280 and stator windings 2230 create many magnetic cycles per motor revolution. More working cycles means increased torque. This system may operate from existing electrical system or batteries used for starting the main engine 110. In addition multiple batteries may be connected in parallel or series to perform multiple functions for the purpose of a preferred increase of voltage for the wheel motors. The wheel motors may also be used for dynamic braking and regenerative braking (charging of the batteries) they may also be used to spin up the wheel during landing to reduce tire wear by matching the speed of the wheel to the touchdown speed. Using the high torque of the wheel motors might be used in further advanced systems for the purpose of reducing takeoff roll. Also the weight of the motors is far less than a transmission to perform the same operations. For example, the use of hydraulic motors has been proposed for this purpose with a weight of more than 250 pounds.

Figure 23:
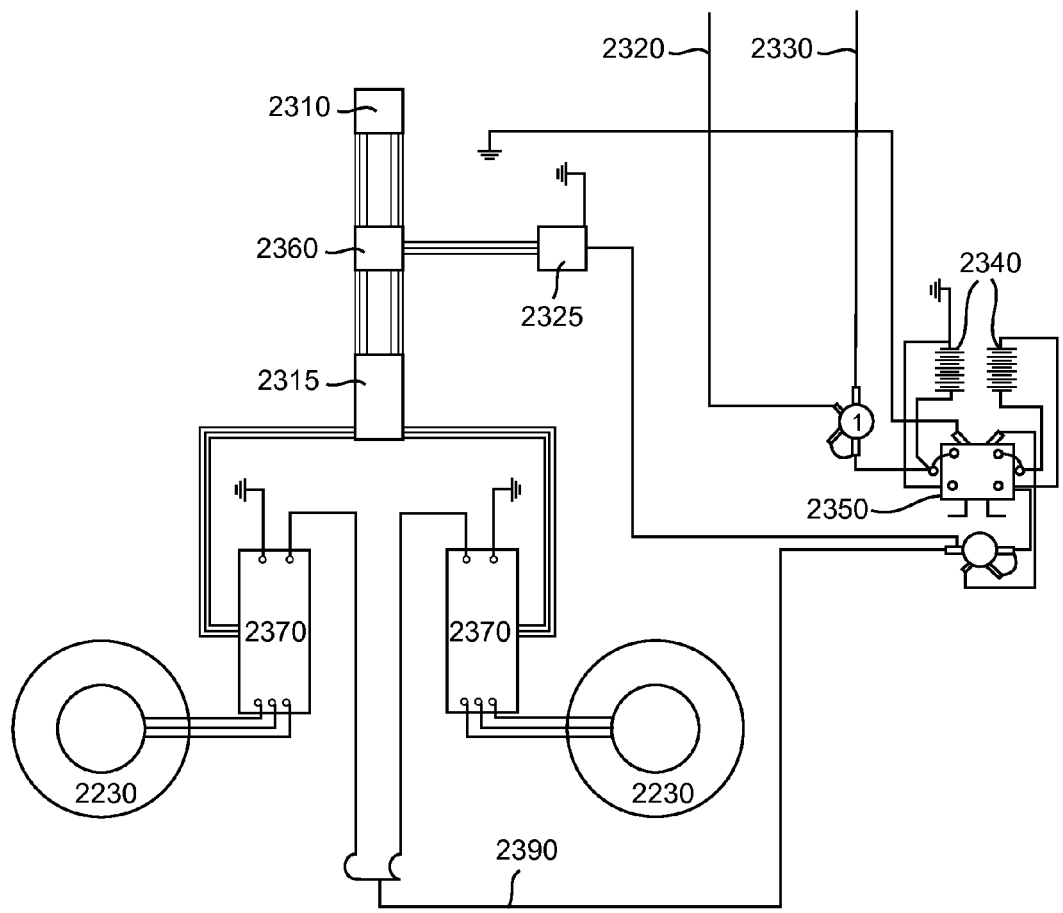
FIG. 23 is a schematic diagram of the wheel motor embodiment of the present invention.

FIG. 23 is a schematic of the wheel motor embodiment of the present invention. Referring to FIG. 23, wheel circuit ON signal 2320 provides a power-on signal to the circuitry of FIG. 23. The circuitry of FIG. 23 may operate using dual voltages, supplied by 12V Bus 2330 and 24 Volt Bus 2390. Joystick 2310 may be used to control movement of the vehicle by applying differential control signals to wheel armatures 2230. Alternately, power may be applied uniformly to wheel armatures 2230 and steering provided by nose wheel steering control 140, or a combination of the two.

Batteries 2340 may store electrical power for ground use and may be augmented by power generated from an alternator connected to engine 110 in a hybrid power mode of operation. Series/Parallel relay 2350 may be used to selectively switch between 12 Volt Bus 2330 and 24 Volt Bus 2390 for charging or discharging batteries 2340 in aircraft mode (24 Volts) or ground mode (12 Volts). Voltage reducer 2325 may be used to reduce voltage from 24 Volts to 12 Volts, if required, or to other voltage levels.

Output from joystick 2310 is fed to signal conditioner 2360 which processes the joystick signals to create directional control signals, which are fed to mixer 2315. The output of mixer is fed to controllers 2370$s$, which in turn drive armatures 2280. Controllers 2370 convert the input DC signals into external commutated DC pulses for driving the wheel motors.

This system avoids coupling and decoupling of complex clutches and transmissions. By using transmitted radio signals or infrared signals it provides method for remote control on the ground if need be for position of the aircraft without the need of an operator inside the aircraft. For example, backing the aircraft into a tight fitting hanger with the operator standing near the tail. The onboard joystick 2310 may be used for positing the aircraft in the same manner as a wheelchair is operated. This system may use existing aircraft electrical system 2390 for power and control movements may be mixed for true tracking style steering for purpose of reducing workload. This system may be added to existing aircraft with only small modifications and has particular applications for handicapped pilots. This system reduces the possibility of ingesting material on the ground into the engine 110 (jet or propeller). Aircraft may be positioned into closer quarters due to the primary engine 110 not being operated such as taxi directly into the hanger. Advanced models may have the propeller 120 clutched such that the idling engine 110 provides a generator for power for the electric motors in the wheels for long distance travel. A simple arrangement like a bolt running through a prop drive mounted on bearings, such that when the bolt is removed the propeller 120 could free wheel on the bearings would allow long distances to be traveled electrically. Using this system it is necessary to either have control of the front wheel or have the nose wheel caster at least a small amount of angle. The in-wheel brushless motors may also be used as part of a hybrid drive system, such that at low speeds (e.g., driving around town), the main engine 110 may be turned off, whereas at highway speeds the main engine 110 may be turned on to provide additional propulsion.

There are many ways others have dealt with the problem of controls of roadable aircraft and (flying cars) the principle problem is that there is a mix between the roll and yaw axis in the separate vehicles. One designer placed the flight controls in the left side of the cockpit and the ground controls on the right. Another designer placed the controls up under the panel where the operator pulls them out when usage is desired. One designer has the control wheel designed such that is the lower half of a circle in flight mode and then it is rotated upward to form a complete circle for road mode. One designer suggests using a steering wheel oriented such that it resembles ones used in buses (shaft closer to vertical angle). Others have the controls located outside or mixed between causing possible confusion in emergency situations. Each of these has their advantages and disadvantages. A simple lightweight solution is needed to meet these needs.

The purpose of the control system is control the aircraft in the air and the car on the ground. The desire is for the controls to be most like the controls of and aircraft in the air and most like that of an automobile on the ground. This conversion should be lightweight and simple in operation. Further the operation of the pedals and controls should be such that it is not likely the feet or hands be caught in the controls during transition. The transformation should be sufficient that the operator reacts to the correct set of controls in the event of an emergency. The transformation should be such that it is not necessary to exit the vehicle during conversion in possible inclement weather.

Figure 13:
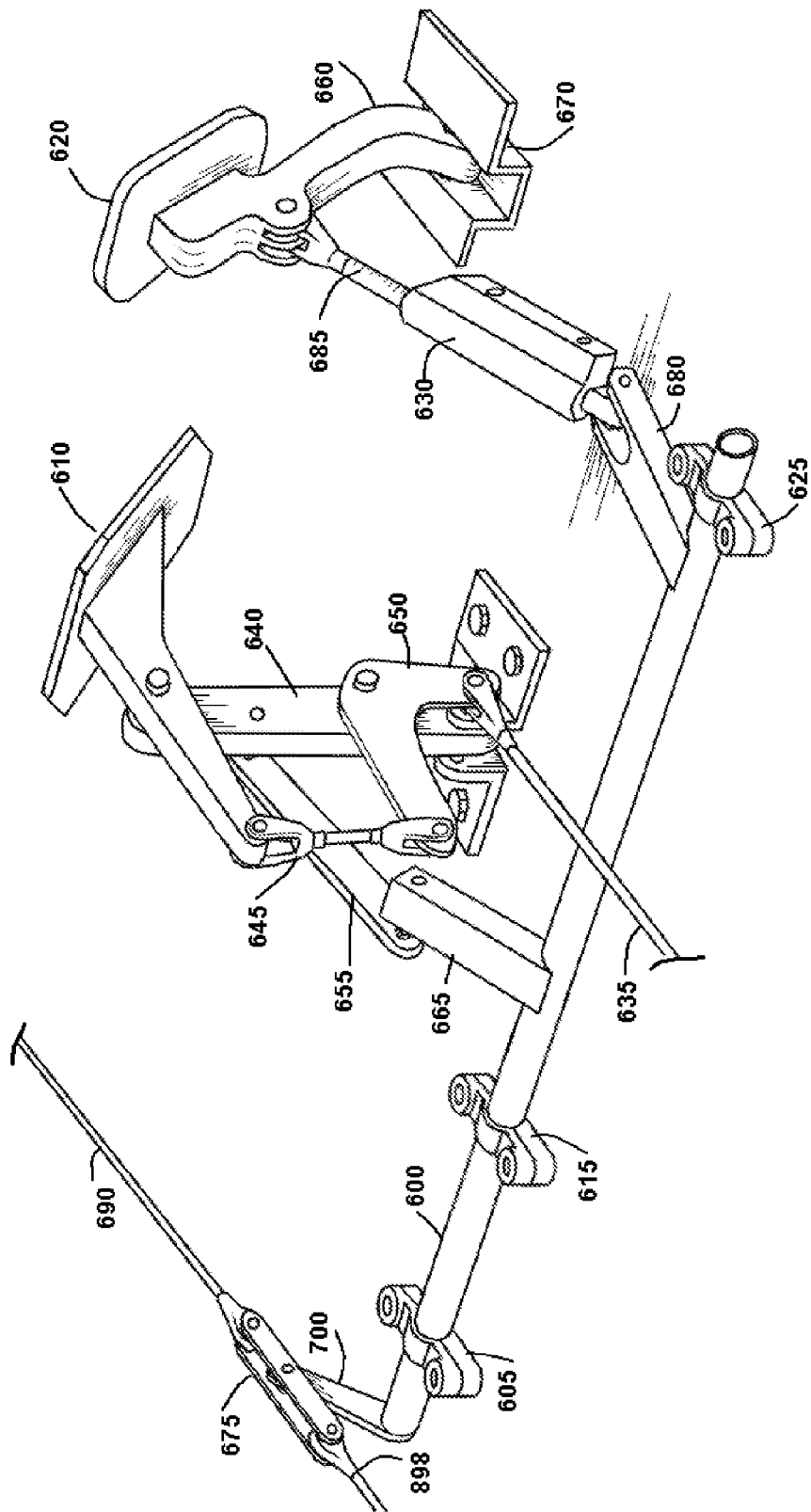
FIG. 13 is a perspective view of the retractable road control pedals of the present invention in the extended position.
Figures 14A, 14B:
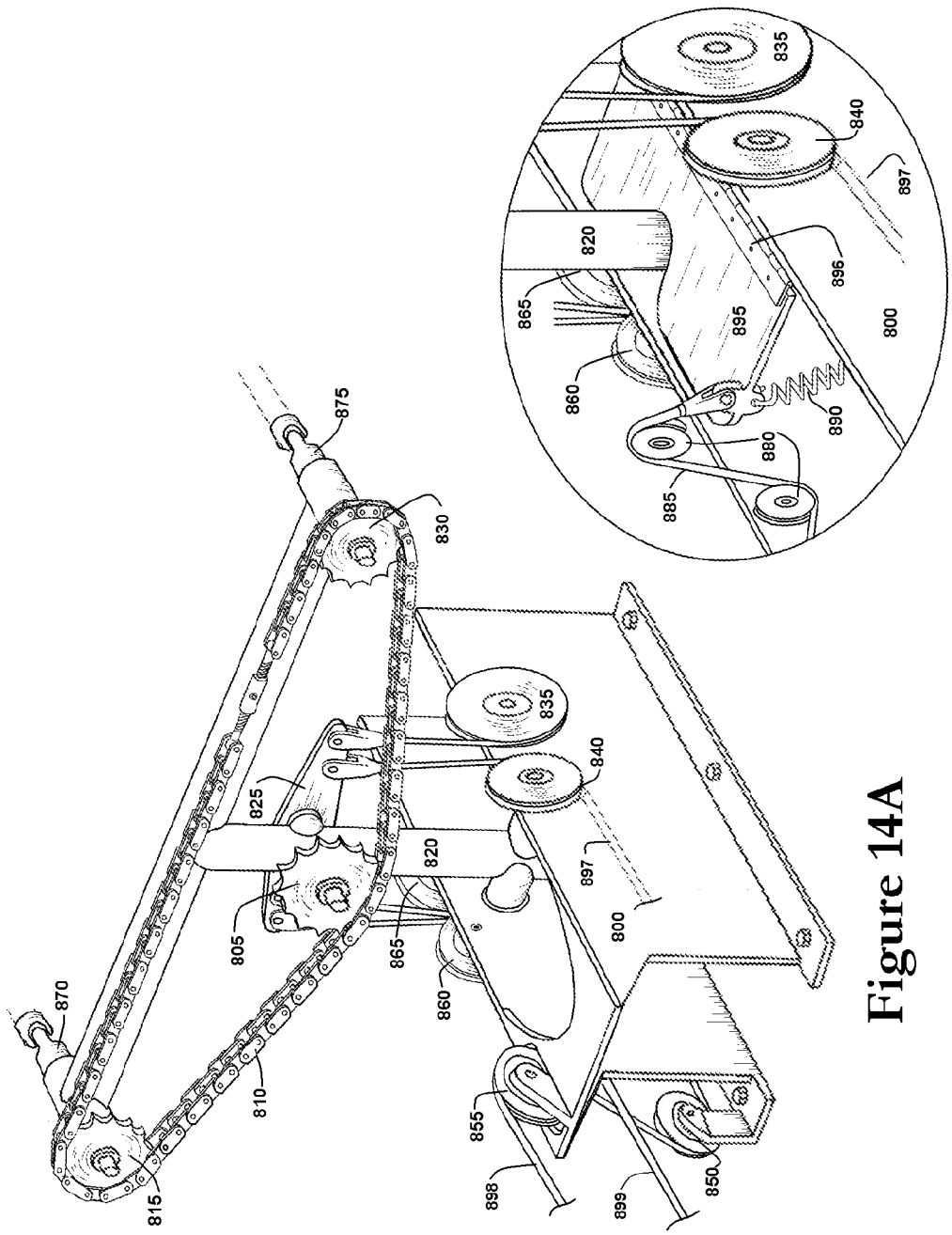
FIG. 14A is a perspective view of the control column, illustrating installation of the chain linkage and how it controls the cables to nose steering for ground operation and ailerons for flight operation. These same cables are tightened or loosened by the mixer of FIG. 16 to change from flight to ground mode and vice versa.
FIG. 14B is an enlarged section of a portion of FIG. 14A illustrating a latch which locks out pitch control during ground operations to prevent the control wheel from moving forward and aft during ground operations
Figure 16:
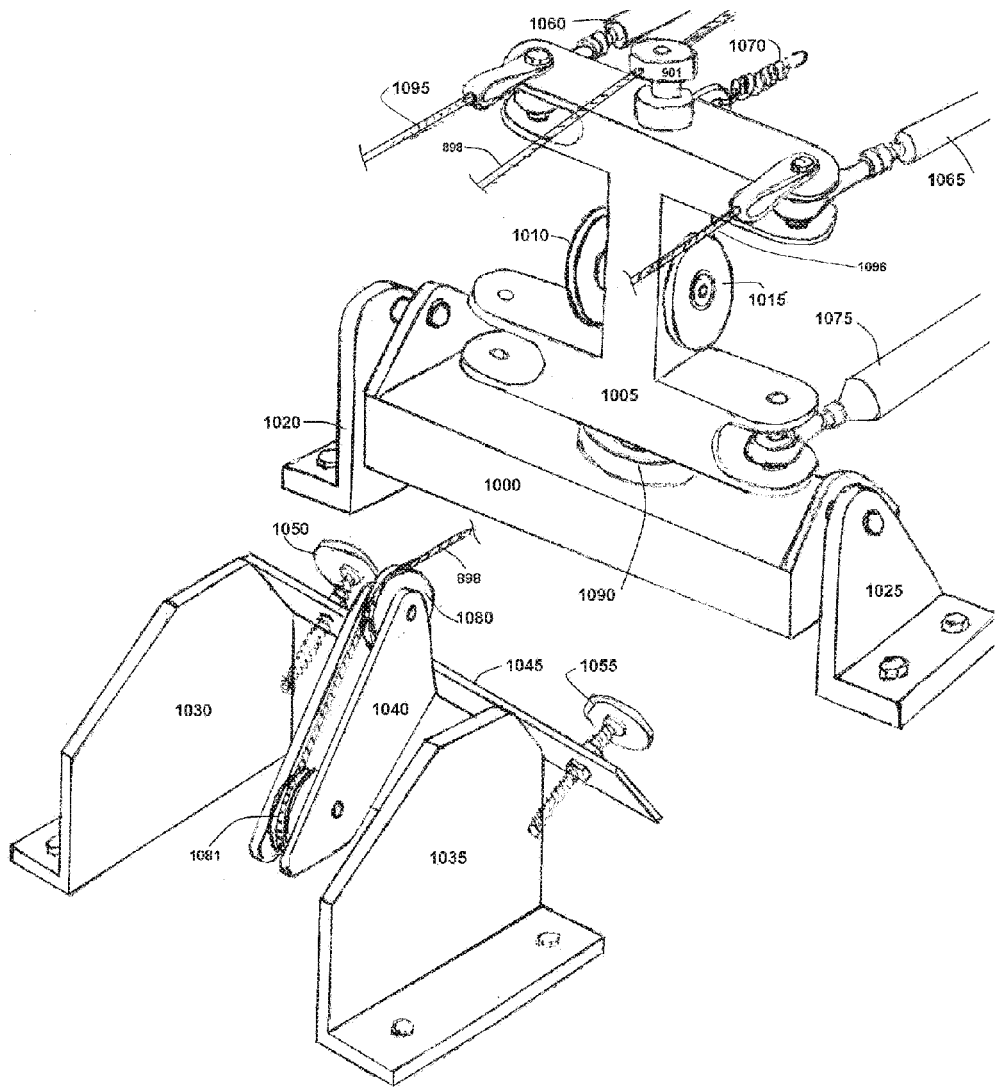
FIG. 16 is a detailed view of the mixer and its stops and controls.
Figure 17:
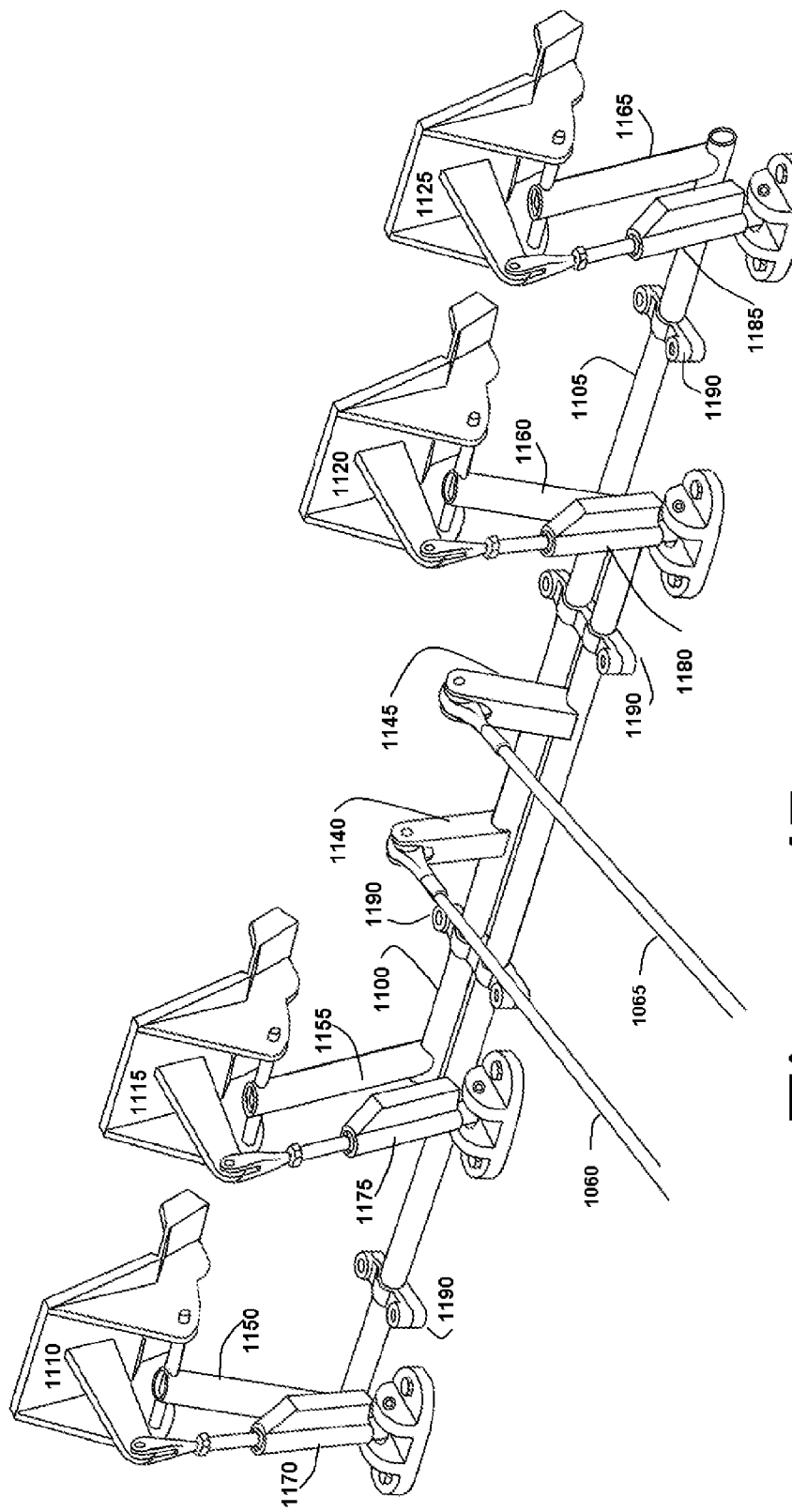
FIG. 17 is a perspective view of the retractable rudder pedals of the present invention and how the pedals interconnect to the mixer.

FIG. 13 is a perspective view of the retractable road control pedals of the present invention. FIG. 16 is a perspective view of the control mixer 800 of FIGS. 14A and 14B, illustrating installation of the chain linkage 830, 805, 810, 815, 870, and 875. Conversion from flight controls (FIG. 17) to ground controls (FIG. 13) is synchronized to the wing movements so that at the end of the wing transition the controls are fully converted to the desired mode without input from the operator. Conventional controls are used with the aid of a mixer (FIGS. 14A and 14B) and 16 connected in a unique way to meet these requirements. Details of the control mixer are illustrated in FIG. 16. The method of operation may simply be stated as two opposing cables connected to the mixer 1000. One cable is tight and the other is loose. The taught cables drive the currently functioning system and the opposing loose cable is connected to the alternate system. The movement of the mixer is directly connected to the wing movement at a ratio to provide the desired tightening and loosing of the cables. By way of example the rudder pedals 1110, 1115, 1120, 1125 control the rudders 240, 250 via cable 1075 for flight but on the ground the rotation of the control wheel controls nose wheel 140 steering (both the Yaw axis).

A parallel pair of cables 1060, 1065 runs from the nose gear 140 to opposing sides of the mixer 1000. One is connected to the roll axis of the aircraft and the other to the yaw axis. In the examples shown when the mixer is moved aft, the cables 1060, 1065 connected to the rudder pedals 1110, 1115, 1120, 1125 are taut and therefore controlling movements to the nose wheel 140. As the mixer 1000 moves forward the rudder pedal cables 1060, 1065 (yaw) become slack and the alternate Aileron (roll) cable become tight and control the nose steering on the ground (Yaw). A pair of stops 1050, 1055 is provided for the forward position (ground). As the mixer 1000 contacts these stops it centers and locks the rudders so they do not blow around on the ground during gusty conditions. Additionally, as illustrated in FIG. 14B, there is a spring 890 connected to the center of the mixer that connects to a latch 895 for the purpose of locking the pitch control 820 in a centered or preferred position, such that during road travel the elevators are at angle to provide good stability, low drag or perhaps down force. The latch 895 is hinged 896 with the hinge axis parallel to the longitudinal axis of the vehicle. The latch 895 is clear of the control column 820 during flight mode. Two return springs 890 may be used to ensure that the control column 820 remains in the unlocked position for flight. In the event that one spring 890 fails the other can perform the function until maintenance can discover the broken spring 890.

Additionally the hinge 896 may be arranged such that gravity orients it away from becoming locked. Still further cycling the control full aft during preflight to forces the latch 895 clear, which strikes a small tab at the aft extremity for this purpose. The spring 1070 connected to the mixer cable 885 should more than double the force necessary to overcome the return springs for proper operation. When the mixer 1000 is in the Forward (ground) mode the latching spring is taut and the control column 820 is ready to latch at any time the operator moves the control near the centering portion of the latch. When the mixer 1000 is in the aft (flight) position the mixer 1000 is free to rotate and synchronizes the rudder pedal movements. Additionally, the latching spring 890 is relaxed and the return springs 1070 takeover control of the latch 895 and moves it away from the control column 820.

A Torsion tube 600 is directly connected to the same operating mechanism as the mixer 1000. This tube 600 operates the brake 620 and gas 610 pedals for ground operation. An over center mechanism 660, 670, 685, 630, 680 is provided for the brake pedal 620 to support the anticipated high forces. The gas pedal 610 is provided with a link 640, 650, 645, 655, 665 such that the output from the pedal 610 is along the centerline of rotation so that throttle position does not change to the engine 110 with transition of the pedals. The size and position of the pedals 610, 620 corresponds to that of the modern automobile. At all times the primary flight controls remain connected. Tube 600 is coupled to pedals 610, 620, and fixed to the airframe by brackets 605, 615, 625 such that when cable 690, 695 is moved forward (ground mode to flight mode) lever 700, activated by clevis 675, rotates the entire pedal assembly forward, moving the gas 610 and brake 620 pedals out of the way for flight mode.

Referring again to FIGS. 14A, 14B and 16, in all three drawings, the lower left side is oriented toward the front of the aircraft. Cable 897 in FIG. 14A winds around pulley 840, and similarly, parallel cable 899 winds around pulley 860 on the right side of box 800. Cables 897 and 899 connect to the steering mechanism in nose gear 140. Cables 897 and 899 are tight in road mode and loose in flight mode. Referring to FIG. 16, cables 897 and 899 (not shown in FIG. 16 for clarity) wrap around pulleys 1010 and 1015 mounted to upright 1005 such that as the mixer 1000 rotates forward in road mode, cables 897 and 899 tighten, enabling nose wheel steering from control wheels, via shafts 870 and 875, via chain mechanism 815, 830, 810, 805 and bellcrank 825. Cables 1095 and 1096 in FIG. 16 are also connected to the nose wheel 140 for steering. Cables 1095 and 1096 tighten with rear rotational movement of the mixer 1000 and provide nose steering with rudder pedals 1110, 1115, 1120, 1125 in flight mode.

Cable 898 in FIG. 14A is connected at the rear at link 675 in FIG. 13 and connected to boss 901 in FIG. 16. Cable 898 acts as the interconnect to the wing movement, as it controls the fore and aft movement of mixer 1000 in FIG. 16. As the wing transitions from flight mode to road mode, and vice versa, the mixer transitions 1000 as well by moving fore and aft. Cable 898 extends forward from boss 901 in FIG. 16 and engages pulley 1080 and pulley 1081 in block 1040. Pulleys 1080 and 1081 rout the cable to the wing movements to provide a tension element to the system. Pulleys 850 and 855 from 14A simply locate the cable to the top of the mixer.

Cable 885 controls the control column latch 895 so that the control wheel does not move in and out (pitch) in road mode. In the rear it connects to latch 895 and in the front it connects to spring 1070 in FIG. 16. Forward movement of mixer 1000 tightens spring 1070 to pull against the tension of spring 890 in FIG. 14B. The cables wrapped around pulleys 835 and 865 are the aileron cables normally referred to as aileron direct cables (roll) in flight mode and the tension on these cables is constant by locating the tangent of pulley 835, 865 along the axis of control column 820 so that pitch movement does not affect roll movements. The cables simply feed to the rear to interconnect to the aileron control system.

Note that in FIG. 16, the portion of cable 898 in the lower part of the drawing should align in height with boss 901 at the upper portion of the drawing. The two components in this drawing are shown slightly offset to separate parts for clarity in illustration, but in actual installation, would be properly aligned so the cable 898 does not bind. Mixer 1000 is located at the top right of FIG. 16 and pivots fore and aft on fittings 1020 and 1025 and rotated on a vertical axis on pivot 1090 in response to control inputs. Stops 1050, 1055, mounted to plate 1045 and supports 1030 and 1035, contact the top of the I shaped mixer 1000 in road mode which pivots on bearing 1090 during rudder movements in flight mode. As the mixer 1000 moves forward and contacts these stops 1050, 1055, the rudder movement stops and does not move around in the wind. U-Joints 870, 875 connect to the control wheels through control tubes coupled to the joints.

The brake cylinders may be arranged in series to each other. This eliminates the need for shuttle valves or switching ports during conversion. The fluid reservoir is connected directly to the car brake master cylinder from the car master cylinder the fluid goes directly to the separate left and right aircraft master cylinders in the pilot side from there it goes to the copilot side and then to the main wheel cylinders. This arrangement causes the car pedal to exert pressure to both rear wheels and because the aircraft cylinders are downstream of this they may exert pressure differentially to the wheel cylinders when in flight mode.

Engine 110 may be provided with NACA ducts 270 for intake air. These ducts are mounted on top of engine 110 so as to avoid ingesting road debris. The use of NACA ducts 270 for engine intakes reduces drag. Engine 110 also uses exhaust augmentation for the purpose of cooling therefore eliminating the need for cooling fans during ground operations. The engine 110 is equipped with exhaust exits that raise the frequency of the exhaust tone therefore reducing the requirements for reducing noise. Because the exhaust is emitted from circular disks the augmentation of the exhaust is enhanced due to increased mixing. The surrounding mixing tube may be lined with acoustical material. Preferable acoustical material will be ceramic beads p/n 357 trade name microlight the beads are of random shape and therefore able to dampen multiple frequency ranges of noise by providing a tortuous path for the sound waves and providing interference. Further the exhaust tip is shaped as a reverse cone that is capped providing a reverberation for the first sound wave to bounce back providing additional noise canceling due to interference.

While the preferred embodiment and various alternative embodiments of the invention have been disclosed and described in detail herein, it may be apparent to those skilled in the art that various changes in form and detail may be made therein without departing from the spirit and scope thereof.

For example, the aforementioned Perel, U.S. Pat. No. 2,573,271, incorporated by reference, discloses a method to pivot two wings into a fuselage for storage. This method leaves the delicate control surfaces in a position, which is likely to be damaged. The present invention, in contrast, allows the forward section of the pivoted wing to be fully enclosed in the fuselage and the rear to be place inside the edge of the tail booms 210, 220 giving them protection from door strikes.

I claim:

1. An aircraft, comprising:
    a fuselage having a longitudinal axis and a vertical axis perpendicular to the longitudinal axis;
    a wing having a predetermined dihedral angle, the wing having a first portion and a second portion, the first portion inclined relative to the second portion by the dihedral angle, the wing rotatably attached to a bottom portion of the fuselage at a center point of the wing between the first portion and the second portion, through a rotatable coupling, the wing rotatable from a first, extended position wherein each of the first portion and the second portion are perpendicular to the longitudinal axis of the fuselage to a second, stowed position where the first portion of the wing lies parallel to the longitudinal axis and bottom portion of the fuselage, and the second portion of the wing lies in a plane inclined from the longitudinal axis and bottom portion of the fuselage by the dihedral angle,
    wherein the rotatable coupling is mounted at an angle skewed from the vertical axis of the fuselage by an amount substantially equal to the dihedral angle of the wing, such that when the wing rotates from the first, extended position to the second, stowed position, the first portion of the wing lies parallel to the longitudinal axis and bottom portion of the fuselage while the second portion of the wing lies in a plane inclined from the longitudinal axis and bottom portion of the fuselage by the dihedral angle.

2. The aircraft of claim 1, further comprising:
    a pusher propeller, mounted to an aft portion of the fuselage,
    wherein when the wing is rotated to the second, stowed position, the second portion of the wing lies aft of the fuselage underneath the pusher propeller, to prevent debris from entering the propeller during ground operation.

3. The aircraft of claim 2, further comprising:
    at least one pair of landing gear wheels;
    at least one electric wheel motor mounted in each of the at least one pair of landing gear wheels, the electric motor comprising a fixed stator and a plurality of magnets mounted to the
    landing gear wheels, such that when a pulsed DC current is applied to the fixed stator, the landing gear wheels rotate.

4. The aircraft of claim 3, further comprising:
    a primary engine, coupled to the propeller, generating rotational power;
    a generator, coupled to the primary engine, generating electrical power;
    at least one battery, coupled, the generator and the electric motor, storing electrical power to power the electric motor and receiving electrical power from the electric motor in a regenerative mode providing braking to the at least one pair of landing gear wheels.

5. The aircraft of claim 1, wherein the wing further comprises:
    a main tubular spar providing primary wing structure;
    extendable and retractable wing tips, attached to each end of the wing, each wing tip comprising:
    a skin portion riding over the surface of the wing such that the skin portion of the wing tip transfers torsional loads to the wing through an overlapping arrangement, and
    a telescopic tubular spar sliding over the main tubular spar, transferring bending loads from the wing tip to the main tubular spar,
    wherein when the wing tips are retracted, the skin portion telescopes around the surface of the wing.

6. The aircraft of claim 5, wherein the wing further comprises:
    a first plurality of rollers mounted to corresponding end portions of the main spar and engaging corresponding portions of the telescopic tubular spar of each wing tip, and a second plurality of rollers on each telescopic tubular spar, engaging a corresponding end portion of the main spar, wherein the first and second plurality of rollers provides resistance to bending loads, and wherein the rollers are arranged at an angle from a surface of the wing to allow the rollers to have a predetermined diameter reducing load and increasing safety.

7. An aircraft of claim 6, wherein each wing tip further includes two split flaps, one mounted to and laying on a top surface of the wing tip and one mounted to and laying on the bottom surface of the wing tip, to provide roll control for the aircraft, while not penetrating the wing tip structure so as to allow the wing tip to retract over the surface of the wing.

8. The aircraft of claim 7, further including a control mechanism for controlling the two split flaps, the control mechanism including:
   a torque tube, for receiving a rotary input control for the split flaps;
   a lever arm, coupled to the torque tube, for converting the rotary motion to linear motion;
   a guide plate, slidably mounted to the wing tip and coupled to the lever arm, moving in a linear direction, in response to movement of the lever arm,
   a pair of guide channels, formed in the guide plate, each coupled to a corresponding one of the two split flaps, such that when the guide plate it moved aft, one of the two split flaps extends, while the other of the two split flaps is retracted, when the guide plate is moved forward, another of the two split flaps extends, the one of the two split flaps is retracted, and when the guide plate is in a neutral position, both of the two split flaps are retracted.

9. The aircraft of claim 8, wherein the torque tube is rotatably mounted to the telescopic tubular spar and slidably coupled to a receiving tube coupled to the main spar, such that when the wing tips extend and retract, the control mechanism for controlling the two split flaps remains functional.

10. The aircraft of claim 7, further comprising:
   a pair of airfoils, each pair retractably mounted to each wing tip, each of pair of airfoils being set at a predetermined angle, wherein roll control of the aircraft along the longitudinal axis of the aircraft is achieved by selectively extending and retracting each of the pair of airfoils on each wing tip, alone or in combination.

11. The aircraft of claim 10, wherein each of the pair of airfoils mounted to each wing tip is mounted along an aerodynamic center axis of the wing, such that the airfoils, when extended, provide roll control while minimizing wing-twisting moments from control movements.

12. The aircraft of claim 1, further comprising a dual control system for converting user controls from aircraft use to ground vehicle use, the control system comprising:
   a set of aircraft pedals, for controlling rudder movement of the aircraft when in aircraft use and also controlling nosewheel steering when in aircraft use, the aircraft pedals hingably mounted to an interior portion of the aircraft fuselage;
   a set of ground control pedals, including a throttle and brake pedal, for controlling throttle and braking when in ground vehicle use, the set of ground control pedals hingably mounted to an interior portion of the aircraft fuselage;
   a mixer, coupled to control linkages from the aircraft pedals and the ground control pedals, for selectively tightening and loosening control cables from the aircraft pedals and the ground control pedals, to selectively enable the aircraft pedals while disengaging the ground control pedals and vice-versa.

13. The aircraft of claim 12, wherein the mixer selectively engages control cables allowing a control wheel to control nosewheel steering when in ground vehicle use.

14. The aircraft of claim 1, wherein the wing further comprises:
   a main tubular spar passing through an entire length of the wing and providing primary wing structure;
   a pair of extendable and retractable wing tips, one of each of the pair of extendable and retractable wing tips attached to a corresponding one of an outer end of the first and second portion of the wing, each wing tip comprising:
   a skin portion overlapping and riding over the surface of the wing such that the skin portion of the wing tip transfers torsional loads to the wing through an overlapping arrangement, and
   a telescopic tubular spar sliding over the main tubular spar, transferring bending loads from the wing tip to the main tubular spar,
   wherein when the wing tips are retracted, the skin portion telescopes around the surface of the wing.

15. The aircraft of claim 14, wherein the wing further comprises:
   a first plurality of rollers mounted to corresponding end portions of the main spar and engaging corresponding portions of the telescopic tubular spar of each wing tip, and a second plurality of rollers on each telescopic tubular spar, engaging a corresponding end portion of the main spar,
   wherein the first and second plurality of rollers provides resistance to bending loads, and wherein the rollers are arranged at an angle from a surface of the wing to allow the rollers to have a predetermined diameter therefore reducing load and increasing safety.

16. The aircraft of claim 15, wherein each wing tip further includes two split flaps, one on a top side of the wing tip and one on the bottom side of the wing tip, to provide roll control for the aircraft, while not penetrating the wing structure so as to allow the wing tip to retract over the surface of the wing.

17. The aircraft of claim 16, further including a control mechanism for controlling the two split flaps, the control mechanism including:
   a torque tube, for receiving a rotary input control for the split flaps;
   a lever arm, coupled to the torque tube, for converting the rotary motion to linear motion;
   a guide plate, slidably mounted to the wing tip and coupled to the lever arm, moving in a linear direction in response to movement of the lever arm,
   a pair of guide channels, formed in the guide plate, each coupled to a corresponding one of the two split flaps, such that when the guide plate it moved aft, one of the two split flaps extends, while the other of the two split flaps is retracted, when the guide plate is moved forward, another of the two split flaps extends, the one of the two split flaps is retracted, and when the guide plate is in a neutral position, both of the two split flaps are retracted,
   wherein the torque tube is rotatably mounted to the telescopic tubular spar and slidably coupled to a receiving tube coupled to the main spar, such that when the wing tips extend and retract, the control mechanism for controlling the two split flaps remains functional.

18. An aircraft, comprising:
   a fuselage having a longitudinal axis and a vertical axis perpendicular so the longitudinal axis;
   a wing having a predetermined dihedral angle, rotatably attached to a bottom portion of the fuselage at a center point of the wing through a rotatable coupling, the wing rotatable from a first, extended position perpendicular to the longitudinal axis of the fuselage to a second, stowed position parallel to the longitudinal axis of the fuselage, wherein the rotatable coupling is mounted at an angle skewed from the vertical axis of the fuselage by an amount substantially equal to the dihedral angle of the wing, such that when the wing rotates from the first, extended position to the second, stowed position, a first portion of the wing lies parallel to the longitudinal axis of the fuselage, and a main wing spar extending through a major portion of the wing and through the rotatable coupling;

wherein the rotatable coupling comprises a box section having at least one tapered inner portion and the main wing spar has at least one tapered portion mating the at least one tapered portion of the rotatable coupling such that when the wing rotates into an extended position principle to the principle axis of the fuselage, the at least one tapered portion of the main wing spar fits into the at least one tapered portion of the rotatable coupling, such that the main wing spar is locked into place and loads from the main wing spar are transferred through the rotatable coupling to the fuselage.

19. The aircraft of claim 18, comprising:

at least one pair of landing gear wheels;

at least one electric wheel motor mounted in each of the at least one pair of landing gear wheels, the electric motor comprising a fixed stator and a plurality of magnets mounted to the landing gear wheels, such that when a pulsed DC current is applied to the fixed stator, the landing gear wheels rotate;

a primary engine, coupled to the propeller, generating rotational power;

a generator, coupled to the primary engine, generating electrical power; and at least one battery coupled to the generator and the electric motor, storing electrical power to power the electric motor and receiving electrical power from the electric motor in a regenerative mode providing braking to the at least one pair of landing gear wheels.

20. The aircraft of claim 19, further comprising:

a controller, coupled to the at least one electric motor, for controlling the at least one electric motor to control movement of the aircraft and direction of the aircraft, wherein the controller further comprises a wireless controller for controlling movement of the aircraft from a position external from the fuselage of the aircraft.

* * * * *